United States Patent
Osanai et al.

(10) Patent No.: US 9,571,690 B2
(45) Date of Patent: Feb. 14, 2017

(54) IMAGE SCANNER AND IMAGE FORMING APPARATUS INCORPORATING THE IMAGE SCANNER

(71) Applicants: Yohei Osanai, Kanagawa (JP);
Yasunobu Youda, Kanagawa (JP);
Tatsuaki Nagano, Kanagawa (JP);
Takayuki Andoh, Kanagawa (JP);
Kaoru Tada, Kanagawa (JP);
Munekazu Hirata, Kanagawa (JP);
Toshiyuki Horikawa, Kanagawa (JP);
Kazushige Kawamura, Kanagawa (JP);
Takuji Kawai, Kanagawa (JP); Koji Hatayama, Kanagawa (JP)

(72) Inventors: Yohei Osanai, Kanagawa (JP);
Yasunobu Youda, Kanagawa (JP);
Tatsuaki Nagano, Kanagawa (JP);
Takayuki Andoh, Kanagawa (JP);
Kaoru Tada, Kanagawa (JP);
Munekazu Hirata, Kanagawa (JP);
Toshiyuki Horikawa, Kanagawa (JP);
Kazushige Kawamura, Kanagawa (JP);
Takuji Kawai, Kanagawa (JP); Koji Hatayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/068,032

(22) Filed: Mar. 11, 2016

(65) Prior Publication Data

US 2016/0277624 A1    Sep. 22, 2016

(30) Foreign Application Priority Data

Mar. 19, 2015  (JP) .................................. 2015-056344
Oct. 15, 2015   (JP) .................................. 2015-203951

(51) Int. Cl.
*H04N 1/04* (2006.01)
*H04N 1/028* (2006.01)
(Continued)

(52) U.S. Cl.
CPC .......... *H04N 1/0423* (2013.01); *H04N 1/0032* (2013.01); *H04N 1/02805* (2013.01);
(Continued)

(58) Field of Classification Search
CPC   H04N 1/0423; H04N 1/0032; H04N 1/02805; H04N 1/0443; H04N 1/10
(Continued)

(56) References Cited

U.S. PATENT DOCUMENTS

2009/0091807 A1* 4/2009 Kagami .............. H04N 1/0057
358/486
2012/0008155 A1* 1/2012 Nakanishi ............. H04N 1/121
358/1.9

(Continued)

FOREIGN PATENT DOCUMENTS

JP            7-298004       11/1995
JP         2001-298586       10/2001
(Continued)

*Primary Examiner* — Cheukfan Lee
(74) *Attorney, Agent, or Firm* — Harness, Dickey & Pierce, PLC

(57) ABSTRACT

An image scanner, which is incorporated in an image forming apparatus, includes a stationary-document reading section, a moving-document reading section disposed at an angle to the stationary-document reading section, a reader movable between the stationary-document reading section and the moving-document reading section, and a reading element movable to different angles while contacting the stationary-document reading section and the moving-document reading section to selectively read a document placed on the stationary-document reading section and a document (Continued)

moving over the moving-document reading section. The image scanner further includes any one of position detector, a combination of a moving device and at least one position sensor, and a combination of at least one pressing member, a framework, and an angle changer.

18 Claims, 20 Drawing Sheets

(51) Int. Cl.
  *H04N 1/10* (2006.01)
  *H04N 1/00* (2006.01)
(52) U.S. Cl.
  CPC ............. *H04N 1/0443* (2013.01); *H04N 1/10* (2013.01); *H04N 2201/0094* (2013.01)
(58) Field of Classification Search
  USPC ................................. 358/496, 498, 497, 474
  See application file for complete search history.

(56) References Cited

U.S. PATENT DOCUMENTS

| 2012/0044514 A1* | 2/2012 | Sugai ................... G03G 15/605 |
| | | 358/1.13 |
| 2013/0335790 A1 | 12/2013 | Narai et al. |
| 2014/0347711 A1* | 11/2014 | Narai ................... H04N 1/0249 |
| | | 358/497 |
| 2015/0341515 A1 | 11/2015 | Youda et al. |
| 2016/0127590 A1* | 5/2016 | Hatayama .......... H04N 1/00631 |
| | | 358/498 |

FOREIGN PATENT DOCUMENTS

| JP | 2003-134311 | 5/2003 |
| JP | 2004-147078 | 5/2004 |
| JP | 2014-003421 | 1/2014 |
| JP | 2014-024612 | 2/2014 |

* cited by examiner

IMAGE SCANNER AND IMAGE FORMING APPARATUS INCORPORATING THE IMAGE SCANNER

CROSS-REFERENCE TO RELATED APPLICATIONS

This patent application is based on and claims priority pursuant to 35 U.S.C. §119(a) to Japanese Patent Application Nos. 2015-056344, filed on Mar. 19, 2015, and 2015-203951, filed on Oct. 15, 2015, in the Japan Patent Office, the entire disclosure of each of which is hereby incorporated by reference herein.

BACKGROUND

Technical Field

This disclosure relates to an image scanner and an image forming apparatus incorporating the image scanner.

Related Art

Various types of electrophotographic image forming apparatuses include copiers, printers, facsimile machines, or multifunction peripherals (MFPs) having two or more of copying, printing, scanning, facsimile transmission, plotter, and other capabilities. Such image forming apparatuses include an image scanner on top or upper part of an apparatus body thereof to read an image formed on a moving document and formed on a still document. For example, a known image scanner has a configuration in which an inclined reading face of a slit glass provided for reading the image of the moving document is disposed aslant at a predetermined angle with respect to a reading face of an exposure glass provided for reading the image on the still document.

In the known image scanner, when an original document is placed on the exposure glass to read the image formed on the original document, a home position of a reader that is movable in a sub-scanning direction is set on a closer side to the exposure glass than the inclined reading face of the slit glass. By reciprocally moving from the home position in the sub-scanning direction, the reader scans the original document placed on the exposure glass and reads the image formed on the original document.

Further, the home position of the reader when an original document is fed by an automatic document feeder (ADF) to the slit glass to be read through the slit glass is set the same as when an original document placed on the exposure glass is read. By moving from the home position toward the slit glass in the sub-scanning direction and previously standing by below the slit glass, the reader scans and reads the image formed on the original document passing over the slit glass.

SUMMARY

At least one aspect of this disclosure provides an image scanner including a stationary-document reading section, a moving-document reading section, a reader, a reading element, and a plurality of position detectors. The stationary-document reading section has a reading face on which a document is placed. The moving-document reading section is a reader over which the document moves. The moving-document reading section is connected to the stationary-document reading section and has an inclined reading face disposed at an angle with respect to the reading face of the stationary-document reading section. The reader is disposed reciprocally movable between the stationary-document reading section and the moving-document reading section. The reading element is attached to the reader and movable to different angles while contacting the reading face of the stationary-document reading section and the inclined reading face of the moving-document reading section. The reading element selectively reads an image formed on the document placed on the stationary-document reading section and an image formed on the document moving over the moving-document reading section. The plurality of position detectors detect different positions of the reader. One of the different positions of the reader includes a home position of the reader.

Further, at least one aspect of this disclosure provides an image scanner including a stationary-document reading section, a moving-document reading section, a reader, a reading element, a moving device, a home position detector, and a designated position detector. The stationary-document reading section has a reading face on which a document is placed. The moving-document reading section is a reader over which the document moves. The moving-document reading section is connected to the stationary-document reading section and has an inclined reading face disposed at an angle with respect to the reading face of the stationary-document reading section. The reader is disposed reciprocally movable between the stationary-document reading section and the moving-document reading section. The reading element is attached to the reader and movable to different angles while contacting the reading face of the stationary-document reading section and the inclined reading face of the moving-document reading section. The reading element selectively reads an image formed on the document placed on the stationary-document reading section and an image formed on the document moving over the moving-document reading section. The moving device causes the reader to reciprocate between the stationary-document reading section and the moving-document reading section. The moving device moves the reader to a home position located closer to the stationary-document reading section than a connecting portion connecting the stationary-document reading section and the moving-document reading section, and moves the reader from the home position before the reading element starts to read one of the image formed on the document loaded on the stationary-document reading section and the image formed on the document conveyed over the moving-document reading section. The home position detector detects the home position of the reader. The designated position detector detects a designated position of the reader at which the reading element reads the image formed on the document being conveyed over the moving-document reading section. The reader moves at high speed toward the designated position until the home position detector detects the home position and moves from the home position at low speed until the designated position detector detects the designated position.

Further, at least one aspect of this disclosure provides an image scanner including a stationary-document reading section, a moving-document reading section, a reader, a reading element, at least one pressing member, a framework, and an angle changer. The stationary-document reading section has a reading face on which a document is placed. The moving-document reading section is a reader over which the document moves. The moving-document reading section is connected to the stationary-document reading section and has a reading face disposed at a different angle from the reading face of the stationary-document reading section. The reader is disposed movable between the stationary-document reading section and the moving-document reading section. The reading element is attached to the reader and vertically pivotable while moving in contact with the reading face of the stationary-document reading section and the reading face of the moving-document reading section. The reading element selectively reads an image formed on the document placed on the stationary-document reading section and an image formed on the document being conveyed over the moving-document reading section. The at least one pressing member presses the reading element against the reading face of the stationary-document reading section and the reading face of the moving-document reading section. The framework supports the reading element via the at least one pressing member. The angle changer changes the framework at an angle substantially parallel to the reading face of the stationary-document reading section to have an angle substantially identical to the reading face of the moving-document reading section.

Further, at least one aspect of this disclosure provides an image forming apparatus including an automatic document feeder to feed the document to the moving-direction reader, and any one of the above-described image scanners to receive the document fed from the automatic document feeder.

DETAILED DESCRIPTION

Figure 1:
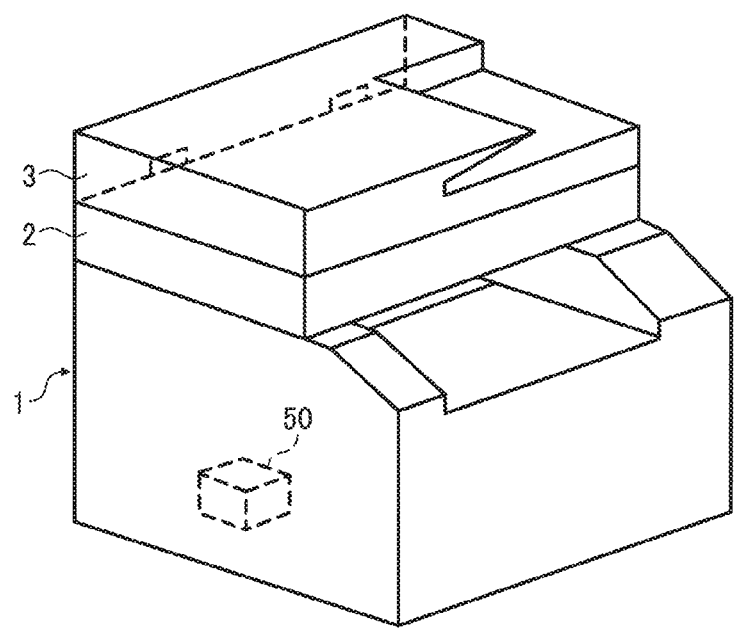
FIG. 1 is a perspective view illustrating an image forming apparatus according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described. Elements (for example, mechanical parts and components) having the same functions and shapes are denoted by the same reference numerals throughout the specification and redundant descriptions are omitted. In order to simplify the drawings and descriptions, elements that do not demand descriptions may be omitted from the drawings as a matter of convenience without notice.

FIG. 1 is a perspective view illustrating an image forming apparatus 1 according to an example of this disclosure.

The image forming apparatus 1 illustrated in FIG. 1 may be a copier, a printer, a facsimile machine, a plotter, a multifunction peripheral or a multifunction printer (MFP) having at least one of copying, printing, scanning, facsimile, and plotter functions, or the like. The image forming apparatus 1 may form an image by an electrophotographic method, an inkjet method, or any other suitable method. According to the present example, the image forming apparatus 1 is an electrophotographic digital copier that forms toner images on a recording medium or recording media by electrophotography.

Further, it is to be noted in the following embodiments that the term "sheet" is not limited to indicate a paper material but also includes OHP (overhead projector) transparencies, OHP film sheets, coated sheet, thick paper such as post card, thread, fiber, fabric, leather, metal, plastic, glass, wood, and/or ceramic by attracting developer or ink thereto, and is used as a general term of a recorded medium, recording medium, recording sheet, and recording material to which the developer or ink is attracted.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

The image forming apparatus 1 includes an image scanner 2 and an automatic document feeder (ADF) 3. Hereinafter, the automatic document feeder 3 is referred to as the ADF 3. The ADF 3 is disposed above the image scanner 2. The image forming apparatus 1 performs image formation based on image data corresponding to the image of an original document read by the image scanner 2, and records (prints) the read image on a recording sheet that functions as a recording medium or transmits and outputs an image file.

The image forming apparatus 1 further includes a controller 50 to control operations performed by the image scanner 2, the ADF 3, and the other devices and units provided to the image forming apparatus 1.

The image scanner 2 has functions of a flatbed scanner, which is a main part of the image scanner 2, and at the same time has functions of a DF scanner to work as an original document reading device together with the ADF 3. The ADF 3 opens and closes with respect to the image scanner 2 via an opening and closing mechanism such as hinges.

The image forming apparatus 1 performs an image reading operation by switching between a mobile original document reading mode and a stationary original document reading mode. In the mobile original document reading mode, the image on the original document is read while the original document is conveyed automatically by the ADF 3. In the stationary original document reading mode, the original document reads the image of the original document loaded on the image scanner 2. It is to be noted that the mobile original document reading mode is also referred to as a DF scanner mode and the stationary original document reading mode is also referred to as a flatbed scanner mode.

Figure 2:
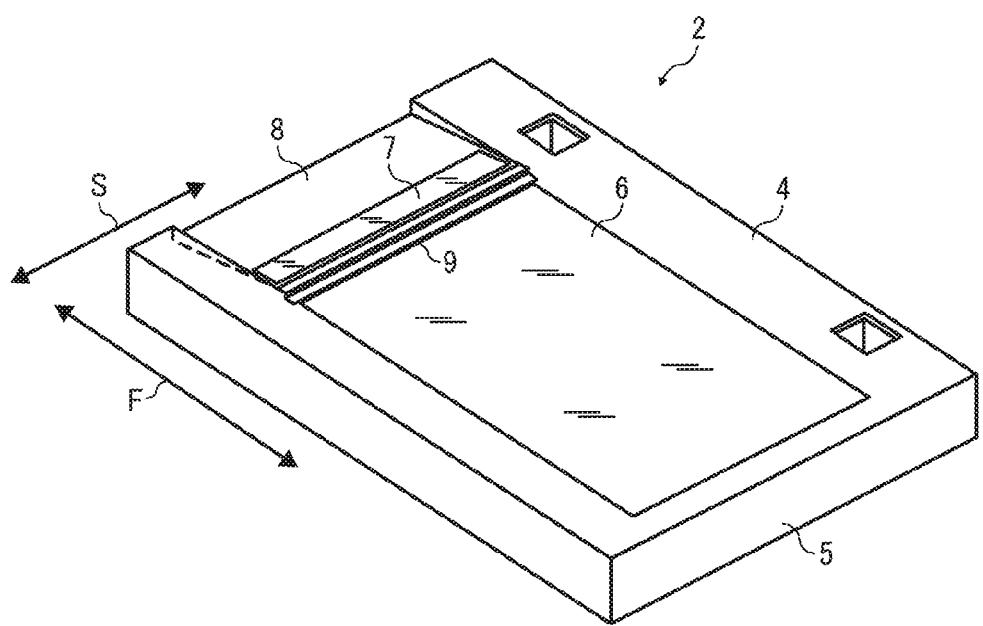
FIG. 2 is a perspective view illustrating an image scanner included in the image forming apparatus of FIG. 1.

FIG. 2 is a perspective view illustrating the image scanner 3 included in the image forming apparatus 1 of FIG. 1.

As illustrated in FIG. 2, the image scanner 2 includes a scanner cover 4, a scanner frame 5, an exposure glass 6, a slit glass 7, a sloped guide surface 8, and an inclination guide 9. In FIG. 2 and other following drawings, reference letter "S" represents a main scanning direction and reference letter "F" represents a sub-sub-scanning direction that intersects the main scanning direction S or is perpendicular to the main scanning direction S.

The scanner cover 4 has a rectangular plane shape and is fixedly fitted to an upper edge portion of the scanner frame 5 having a square frame shape. The scanner cover 4 supports an exposure glass 6 and a slit glass 7. The exposure glass 6 functions as a stationary-document reading section on which an original document is placed still. The slit glass 7 functions as a movable original document reader through which the original document conveyed by the ADF 3 passes.

The exposure glass 6 is also referred to as a flatbed exposure glass and the reading surface of the exposure glass includes a flat and planar transparent member. Examples of an original document to be loaded on the exposure glass 6 are a single original document, a bundle of original documents, a stiff paper (such as a cash card, a thick paper, and a driver's license), and an original document that cannot be jammed.

The slit glass 7 is also referred to as a DF exposure glass and the reading surface of the slit glass 7 includes a flat belt-shaped transparent member. When the ADF 3 separates an original document from the bundle of original documents of flexible cut sheets like papers and conveys the separated original document along a document conveying path provided in the ADF 3 and the image scanner 2, part of the original document sequentially comes to face the slit glass 7 while the original document is being conveyed in the document conveying path.

Further, an upper face of the slit glass 7 is an inclined surface that forms a preset angle of inclination with respect to an upper face of the exposure glass 6. The scanner cover 4 is provided with the sloped guide surface 8 on one side of the slit glass 7. The sloped guide surface 8 is inclined and formed to have the same plane as the upper face of the slit glass 7.

Further, the scanner cover 4 is further provided with an inclination guide 9 on the other side of the slit glass 7. The inclination guide 9 is inclined to form a given angle with respect to the slit glass 7. The inclination guide 9 is disposed between the exposure glass 6 and the slit glass 7 and a portion of the inclination guide 9 on a side of the exposure glass 6 is arranged to be lower that a portion of the inclination guide 9 on a side of the slit glass 7.

Further, the inclination guide 9 functions as a reference scale when an original document is placed on the exposure glass 6.

Figure 3:
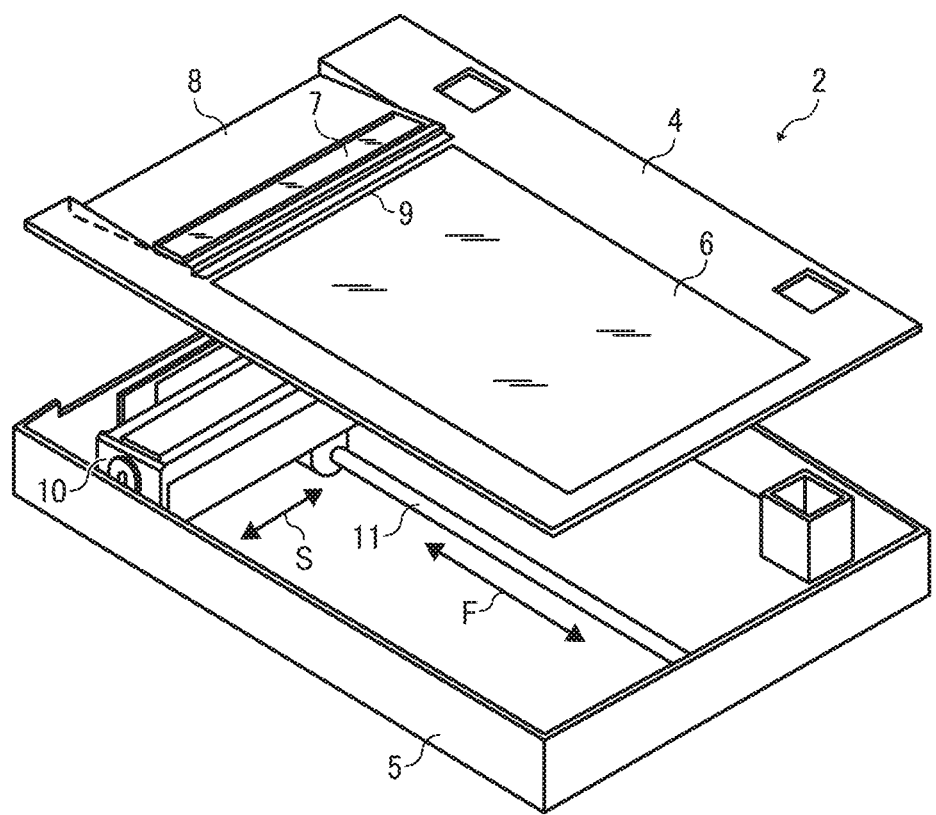
FIG. 3 is an exploded perspective view illustrating the image forming apparatus of FIG. 1.

FIG. 3 is an exploded perspective view illustrating the image forming apparatus 1 of FIG. 2.

As illustrated in FIG. 3, a reader 10 and a guide rod 11 are disposed and positioned inside the image scanner 2. The guide rod 11 extends in the sub-scanning direction F.

The reader 10 includes a light emitter such as a light source. The light emitter emits light through the exposure glass 6 so as to irradiate the image side of the original document facing the upper face of the exposure glass 6. Further, the reader 10 can emit light from the light source onto the image side of the original document while being conveyed and facing the upper face of the slit glass 7 via the slit glass 7.

Further, the reader 10 can read the image side of the original document either placed on the exposure glass 6 or passing through the slit glass 7 in the main scanning direction S by line scanning.

It is to be noted that the main scanning direction S is a direction parallel to both the upper face of the exposure glass 6 and the upper face of the slit glass 7. Accordingly, the reader 10 includes a scanning region extending in the main scanning direction S. In the scanning region, the reader 10 reads an image formed on a stationary original document or a mobile original document via the exposure glass 6 or the slit glass 7.

The reader 10 is movably guided in the sub-scanning direction F by the guide rod 11. At the same time, the reader 10 slidably contacts at least one of the exposure glass 6 and the slit glass 7 at a position above both ends in a longitudinal direction of the reader 10. Therefore, even though the reader 10 is movable along the guide rod 11 that functions as a guide, the reader 10 is restricted to incline about a central axis of the guide rod 11 and is movable in the sub-scanning direction F along the lower face of the exposure glass 6 and the lower face of the slit glass 7.

Specifically, the reader 10 includes an integrated optical scanning unit, a bracket that supports the integrated optical scanning unit, and multiple compression coil springs provided in a compressed state between the integrated optical scanning unit and the bracket.

The reader 10 is driven by a moving mechanism to be reciprocally movable in the sub-scanning direction F.

As described above, the configuration and operations of the image scanner 2 according to an example of this disclosure is different in detecting a home position HP of the reader 10 when compared with a comparative reader. Therefore, the following description is given of the configuration and operations of detecting the home position HP of the reader 10 in the image scanner 2 and the ADF 3 with reference to FIG. 4 and thereafter.

Figure 4:
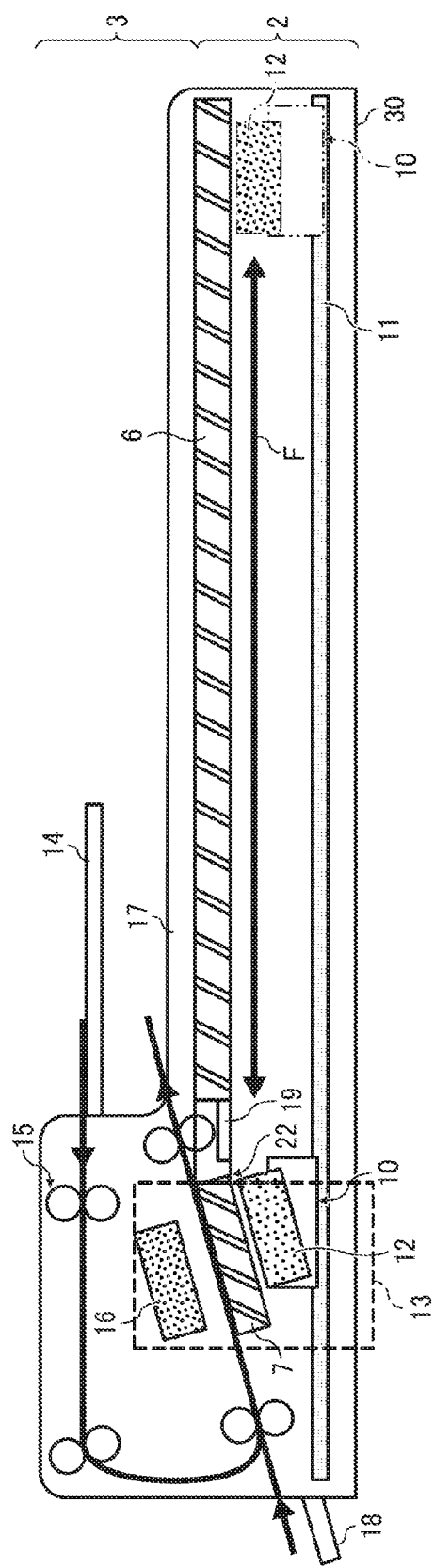
FIG. 4 is a cross sectional view illustrating the configuration and operations of the image scanner and an automatic document feeder (ADF) according to an example of this disclosure.

FIG. 4 is a cross sectional view illustrating the configuration and operations of the image scanner 2 and the ADF 3 according to an example of this disclosure.

Figure 5:
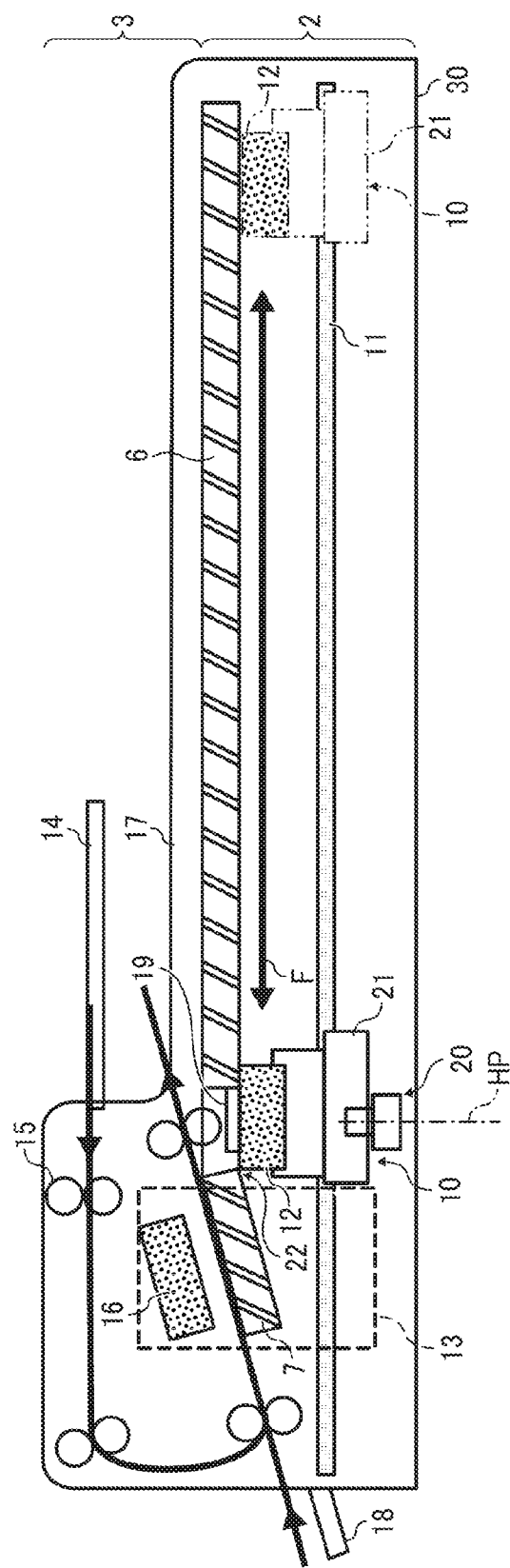
FIG. 5 is a cross sectional view illustrating the image scanner and the ADF, including a home position sensor to detect a home position of a reader according to an example of this disclosure.

As illustrated in FIG. 4 and FIG. 5 shown below, in order to simplify the drawings, the sloped guide surface 8 and the inclination guide 9 illustrated in FIGS. 2 and 3 are omitted and a connecting portion 22 that connects the exposure glass 6 and the slit glass 7 are depicted.

A shading sheet 19 that includes a white reference sheet is disposed at a position that is closer to the exposure glass 6 than the connecting portion 22. The slit glass 7 is disposed tilted from the connecting portion 22 toward the left side of FIG. 4. Thus, the connecting portion 22 may further includes a tilted portion of the exposure glass 6 and the slit glass 7.

Further, in the ADF 3 illustrated in FIGS. 4 and 5, a region surrounded by a black thick solid line indicates an original document placed on a document sheet tray 14 provided to the ADF 3 together and a black thick solid line that passes through the region indicates a document conveying path of an original document fed via a bypass tray 18. Details of the configuration illustrated in FIG. 5 are described below.

As illustrated in FIG. 4, the reader 10 of the image scanner 2 is disposed reciprocally movable by the moving mechanism via the guide rod 11 in the sub-scanning direction F along the document conveying path between a right end portion of the lower face of the exposure glass 6 and a left end portion of the lower face of the slit glass 7.

As illustrated in FIGS. 4, 5, 6, 9, and 11, the reader 10 that is located at the right end portion of the lower face of the exposure glass 6 is illustrated with a two-dot chain line.

The reader 10 is provided with a reading element 12 as illustrated with a pear skin pattern in FIG. 4. The reading element 12 functions as a reading element similar to an integrated optical scanning unit. The reading element 12 includes a light source and one or more contact image sensors (CIS) that longitudinally extends in the main scanning direction.

It is to be noted that the configuration of the reading element 12 is not limited thereto. For example, the reading element 12 can include a light source, a lens, a charge-coupled device (CCD), and a mirror to perform line scanning on an image formed on an original document in the main scanning direction.

The reader 10 reciprocally moves in the sub-scanning direction F along the guide rod 11, so as to read image data of an image formed on an original document. Specifically, the reader 10 reads an image formed on an original document placed or set on the exposure glass 6 or reads an image formed on one side of an original document conveyed by the ADF 3 by moving to an ADF document reading position 13 that is surrounded by a dotted line. In FIG. 4, the reading element 12 attached to the reader 10 that has moved to the ADF document reading position 13 on the left side of the drawings is inclined due to inclination displacement (for example, attitude displacement or swing) following an inclined surface of the slit glass 7.

Thus, the reading element 12 is attached to the reader 10 such that the reading element 12 displaces (swings) obliquely with respect to the exposure glass 6 to incline and shifts vertically as a reading face of the slit glass 7 contacts an inclined surface of the exposure glass 6 tilted to the reading face of the slit glass 7.

By contrast, in a case in which multiple flexible original documents such as papers are read with the ADF 3, multiple original documents are set to the document sheet tray 14. The multiple original documents set to the document sheet tray 14 are separated by a separating unit 15. Then, when passing the ADF document reading position 13, images formed on both sides of the separated original document are read simultaneously by the reading element 12 and a DF reading element 16 illustrated in a pear skin pattern. Thereafter, the original document is discharged to a document discharging portion 17.

Further, a stiff original document such as a cash card and a driver's license or an original document that cannot be jammed is fed from the bypass tray 18. After passing through the ADF document reading position 13, both images formed on both sides of the stiff original document or the original document that cannot be jammed are read simultaneously by the reading element 12 and the DF reading element 16. Thereafter, the original document is discharged to the document discharging portion 17. By supplying an original document via the bypass tray 18, the original document travels in a completely straight document conveying path. Therefore, a stiff original document can pass through the document conveying path, and therefore a paper jam rate of stiff original documents can be reduced.

Figure 6:
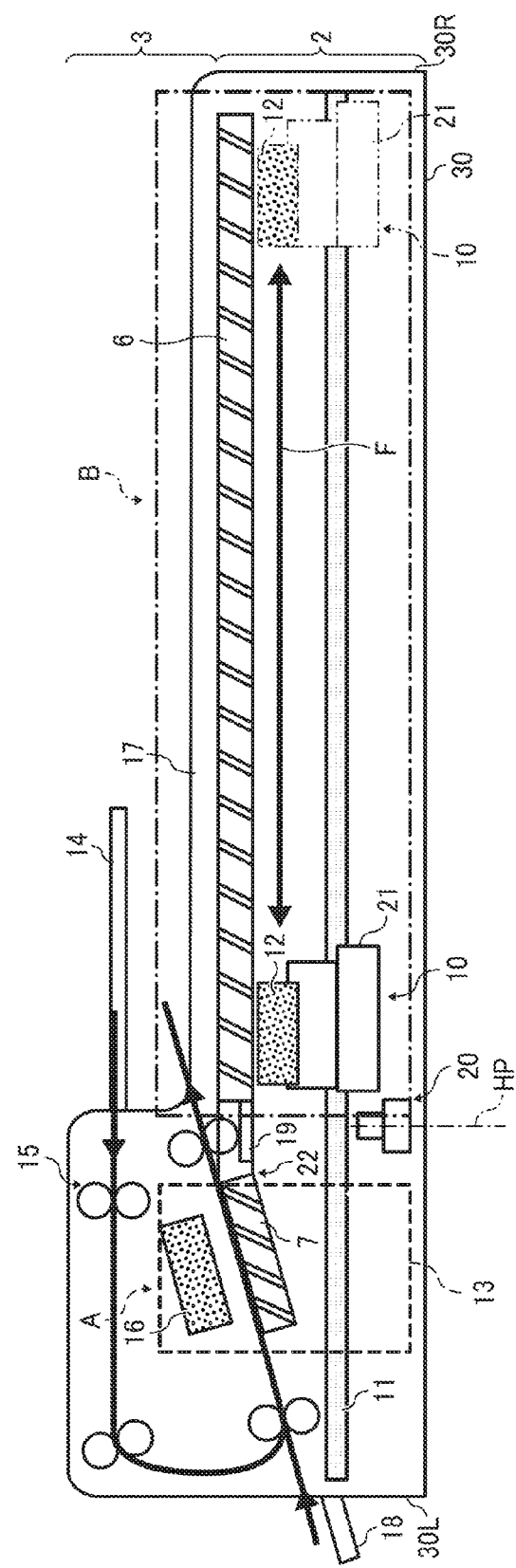
FIG. 6 is a cross sectional view illustrating the operations of the image scanner and the ADF of FIG. 5.

Now, a description is given of a configuration of a home position sensor 20 with reference to FIGS. 5 and 6. The home position sensor 20 includes a photosensor to detect the home position HP of the reader 10.

FIG. 5 is a cross sectional view illustrating the image scanner 2 and the ADF 3, including the home position sensor 20 to detect the home position HP of the reader 10 according to an example of this disclosure. FIG. 6 is a cross sectional view illustrating the operations of the image scanner 2 and the ADF 3 of FIG. 5. In FIG. 6, reference numeral "30L" indicates a left wall disposed inside a device apparatus 30 of the image scanner 2 and reference numeral "30W" indicates a right wall disposed inside the device apparatus 30 of the image scanner 2.

As illustrated in FIG. 5, the home position HP of the reader 10 is located within a moving area of the reader 10 where the reading element 12 does not incline. Specifically, the home position HP of the reader 10 is located at a position immediately before the reading element 12 inclines and on the right side of the drawing sheet to the left side of the shading sheet 19.

As illustrated in FIG. 5, the home position sensor 20 functions as a stationary detector that forms a position detector to detect the home position HP of the reader 10. The home position sensor 20 also functions as a home position detector. The home position sensor 20 is located at the above-described position corresponding to the home position HP of the reader 10. The home position sensor 20 is a light transmission type photosensor that includes a light emitting part and a light receiving part.

As illustrated in FIGS. 5 and 6, the home position HP of the reader 10 is detected by a position detector that is a combination of the home position sensor 20 and a feeler 21. That is, the feeler 21 projects downwardly from a slide engaging portion with the guide rod 11 in the reader 10. The feeler 21 that functions as a movable detector is formed along the sub-scanning direction F as a single unit with the reader 10. As described above, the home position sensor 20 detects the home position HP of the reader 10 together with the feeler 21.

As illustrated in FIG. 6, in a case in which the home position sensor 20 that is a light transmission type photosensor is turned on due to blocking of light, the length of the feeler 21 in the sub-scanning direction F is adjusted so that the reader 10 resides in a DF reading region A. In a case in which the home position sensor 20 is turned off when the light is not blocked, the length of the feeler 21 in the sub-scanning direction F is adjusted so that the reader 10 resides in a FB reading region B.

Figure 7:
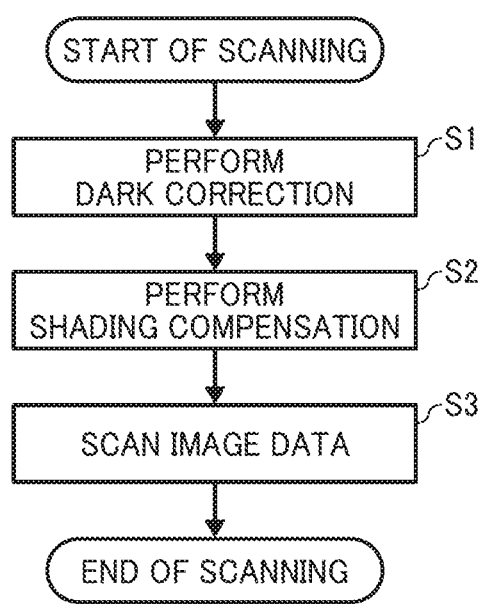
FIG. 7 is a flowchart of an entire reading operations of the image scanner.
Figure 8:
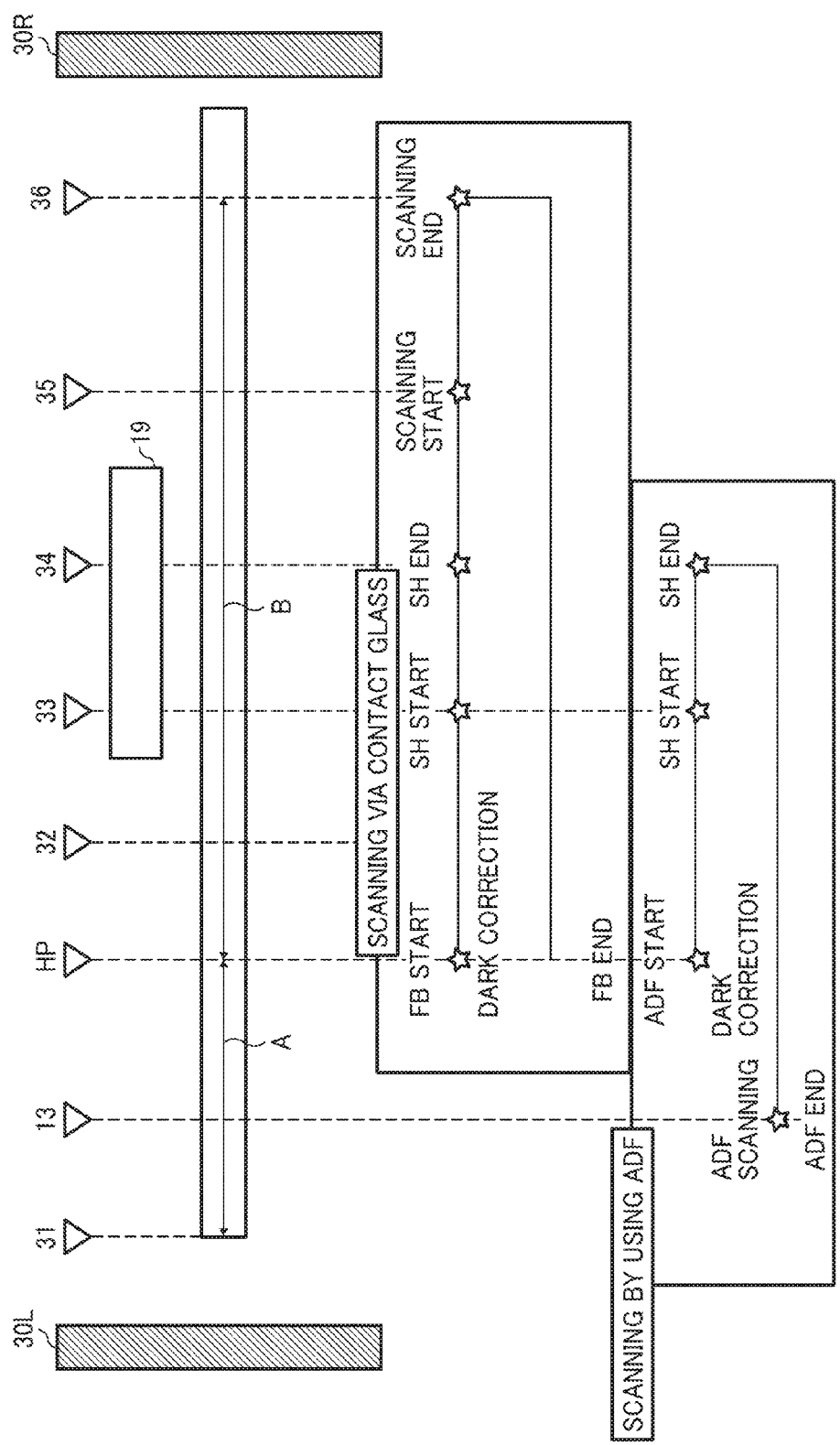
FIG. 8 is a diagram illustrating a position of the reader relative to the image scanner and operations of the reader when reading an original document via an exposure glass and the ADF.

Now, a description is given of the entire reading operations of the image scanner 2 associated with the position of the reader 10, with reference to FIGS. 7 and 8.

FIG. 7 is a flowchart of the entire reading operations of the image scanner 2. FIG. 8 is a diagram illustrating a position of the reader 10 relative to the image scanner 2 and operations of the reader 10 when reading an original document via the exposure glass 6 and the ADF 3.

In FIG. 8, the home position HP of the reader 10 is indicated as "HP" and a shading compensation is indicated as "SH". Inverted triangle marks illustrated at an upper part of FIG. 8 indicate respective positions related to movement of the reader 10 previously set to the image scanner 2. Specifically, the inverted triangle marks indicate, in the order from the leftmost inverted triangle mark from the left wall 30L to the right wall 30R of the image scanner 2, a leftmost position 31, an ADF document reading position 13, the home position HP, an output switching position 32 of the home position sensor 20, a shading compensation (SH) start position 33, a shading compensation (SH) end position 34, a scanning start position 35, and a maximum reading end position 36.

Figure 10:
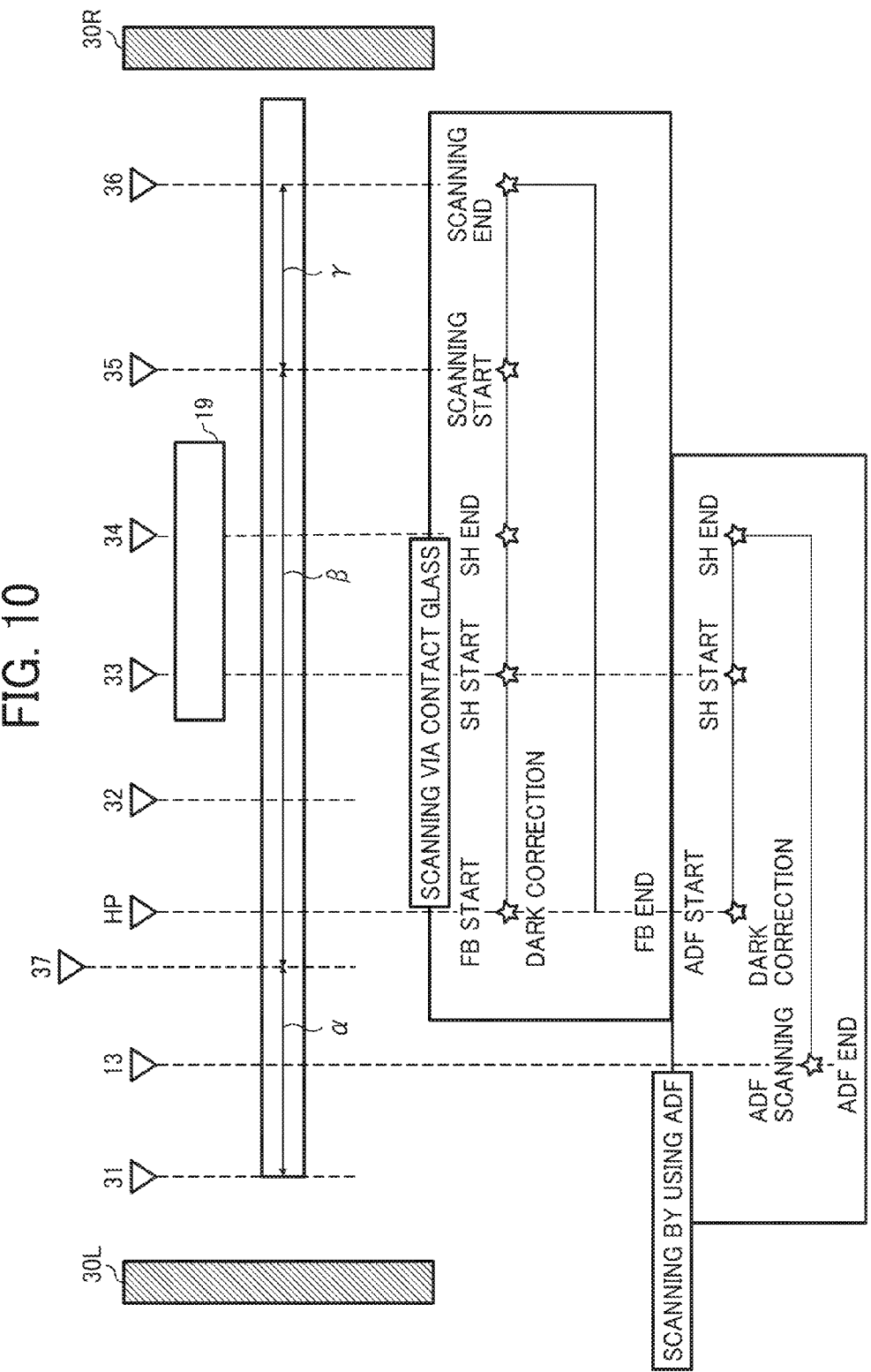
FIG. 10 is a diagram illustrating a position of the reader relative to the image scanner and operations of the reader when reading an original document via an exposure glass and the ADF of FIG. 9.

Further, "the output switching position 32 of the home position sensor 20" indicates an action to switch an output voltage value, for example, to change from dark correction to shading compensation while the reader 10 shifts from a dark correction position to a shading compensation position. The term "FB" indicates the reader 10 in a flatbed scanner mode and "ADF" indicates the reader 10 in an ADF scanner mode. The operations described above are substantially same as operations illustrated in FIG. 10 according to the following example. That is, the configuration and operations of FIG. 10 is basically identical to the configuration and operations of FIG. 8, except that the configuration and operations of FIG. 10 further includes a DF sensor output switching position 37.

First, a description is given of operations performed by the reader 10 when an original document is placed on the exposure glass 6.

As illustrated in FIG. 8, the reader 10 performs dark correction at the home position HP (step S1 in FIG. 7). Then, the reader 10 performs shading compensation while moving (reciprocating) to the right side of the drawing (step S2 in FIG. 7). Accordingly, the reader 10 scans and reads image data of the original document on the exposure glass 6 (step S3 in FIG. 7).

The reading element 12 reads the reading operation of the original document in a substantially horizontal plane without tilting the reading element 12. At completion of the reading operation of the original document, the reader 10 shifts and returns to the home position HP.

Next, a description is given of operations performed by the reader 10 when an original document is conveyed in the ADF 3.

As illustrated in FIG. 8, the reader 10 performs dark correction at the home position HP, followed by the shading compensation while moving (reciprocating) to the right side of the drawing (step S2 in FIG. 7). After completion of the shading compensation, the reader 10 shifts to the left side of the drawing, causes the reading element 12 to incline, and reads the original document conveyed by the ADF 3 at the ADF document reading position 13.

As described above, the home position HP of the reader 10 is located at the position on the right side from the ADF document reading position 13, which is a position immediately before the reading element 12 becomes obliquely inclined with respect to the reading face of the exposure glass 6. By so doing, the reading element 12 is not obliquely inclined with respect to the reading face of the exposure glass 6 except when reading an original document conveyed by the ADF 3 (see FIGS. 5 and 6). Consequently, when compared with a configuration in which the ADF document reading position 13 is set to the home position HP, the number of inclinations of the reading element 12 is reduced, and therefore a reduction in the operating sound can be enhanced. Further, the reading element 12 includes a hemispherical projection. The hemispherical projection is disposed at an upper part thereof to contact the lower face of the exposure glass 6 and the lower face of the slit glass 7. With the above-described configuration, the hemispherical projection is prevented from being worn.

In this case, when the reader 10 stands by at the lower part of the slit glass 7, the home position sensor 20 is turned on to block light to detect the reader 10. It is because, when the reader 10 is located at the leftmost position 31 of FIG. 8, the home position sensor 20 cannot block the light, and therefore cannot detect anything. With this configuration, when the home position sensor 20 is not blocked and turned off, the reader 10 cannot be returned (hereinafter, referred to as a homing operation) to the home position HP.

With the configuration in which the home position sensor 20 is blocked at the leftmost position 31 illustrated in FIGS. 6 and 8, the homing operation falls on either one of the following operations.

(1) The home position sensor 20 is blocked and turned on:
Move the reader 10 to the right side, confirm whether or not the home position sensor 20 is not blocked and turned off, and move the reader 10 to the left side. Accordingly, the reader 10 is moved to the home position HP.

(2) The home position sensor 20 is not blocked and turned off:
Move the reader 10 to the left side, set the home position sensor 20 not to be blocked and turned off, and move the reader 10 by a predetermined distance. Accordingly, the reader 10 is moved to the home position HP.

However, when the home position sensor 20 is not blocked and turned off at the leftmost position 31, it is difficult to determine whether the reader 10 is located below the exposure glass 6 or at the leftmost position 31. Therefore, the homing operation cannot be performed. In order to avoid this inconvenience, it is preferable to set a distance to make the feeler 21 block light of the home position sensor 20 even when the reader 10 is located at the leftmost position 31 of FIG. 8.

To create the above-described configuration, as illustrated in FIGS. 5 and 6, it is more likely that the length of the feeler 21 is longer than the length of the reader 10 in the sub-scanning direction F. In the reader 10 illustrated in FIGS. 5 and 6, the feeler 21 protrudes outwardly to the right side of the reader 10. However, when the home position sensor 20 is disposed near the ADF document reading position 13, the feeler 21 protrudes to the left side of the reader 10. Consequently, the length in the sub-scanning direction F of the feeler 21 of the reader 10 affects on the size of the image scanner 2, thereby increasing the size of the image scanner 2.

In order to reduce the size, a DF sensor 25 (see FIG. 9) is provided to an image scanner.

Example 1

Figure 9:
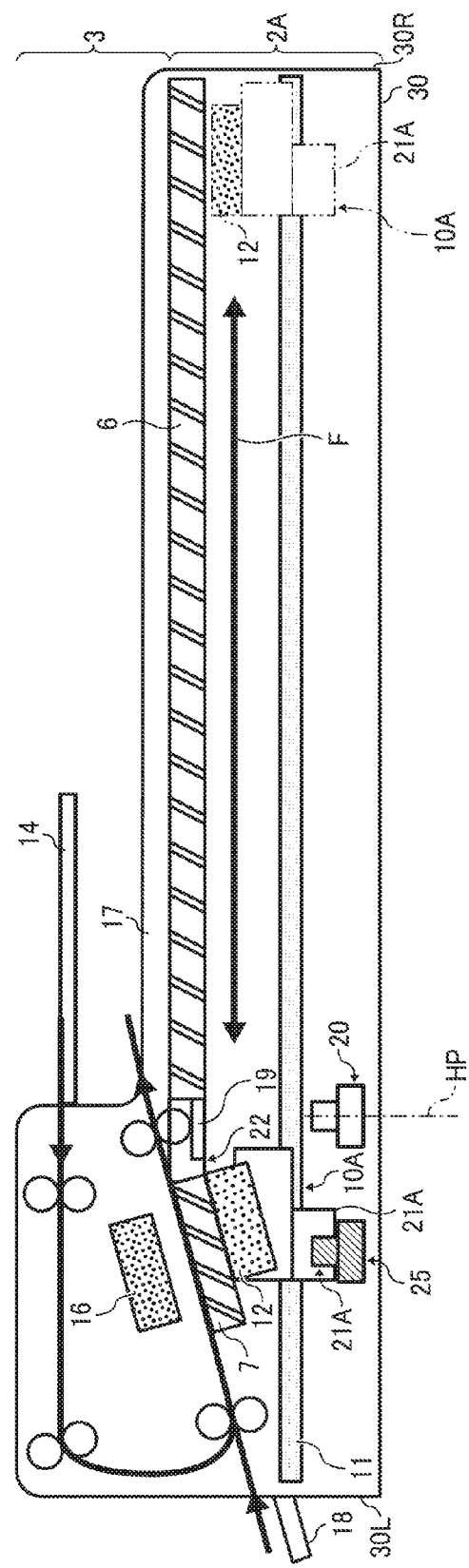
FIG. 9 is a cross sectional view illustrating the configuration and operations of the image scanner and the ADF according to an example of this disclosure.

A description is given of an image scanner 2A according to Example 1 of this disclosure with reference to FIGS. 9 and 10.

FIG. 9 is a cross sectional view illustrating the configuration and operations of an image scanner 2A and the ADF 3 according to Example 1 of this disclosure. FIG. 10 is a diagram illustrating a position of a reader 10A relative to the image scanner 2A and operations of the reader 10A when reading an original document via the exposure glass 6 and the ADF 3 of FIG. 9.

The image scanner 2A illustrated in FIGS. 9 and 10 basically has an identical configuration to the image scanner 2 illustrated in FIGS. 5 through 8. Except, while the image scanner 2 illustrated in FIGS. 5 through 8 includes the reader 10 provided with the feeler 21, the image scanner 2A illustrated in FIGS. 9 and 10 includes a reader 10A provided with a feeler 21A and the DF sensor 25. The feeler 21A of the reader 10A has a shorter length in the sub-scanning direction F than the feeler 21. The DF sensor 25 is located at a position illustrated in FIG. 9.

The home position sensor 20 functions as a stationary detector that is disposed within the first moving area of the reader 10A where the reading element 12 attached to the reader 10A is not inclined, so as to detect a home position HP of the reader 10A. The DF sensor 25 functions as a stationary detector that is disposed within a second moving area of the reader 10A where the reader 10A is inclined. The DF sensor 25 also functions as a designated position sensor. The DF sensor 25 is a light transmission type photosensor having the same configuration as the home position sensor 20.

By adding the DF sensor 25, when the reader 10A is located at the leftmost position 31, the home position sensor 20 is not blocked but the DF sensor 25 that is located on the left side of the home position sensor 20 is blocked. Accordingly, the length of the feeler 21A in the sub-scanning direction F can be shorter than the length of the reader 10A in the sub-scanning direction F.

In FIG. 10, a range α indicates a detection range of a DF reading position, a range β indicates a detection range of a flatbed reading home position and an output correction position, a range γ indicates a detection range of a flatbed reading. Since the "ADF document reading position 13" and the "DF sensor output switching position 37" are relative positions to each other, these positions can be switched.

In Example 1, the home position sensor 20 and the DF sensor 25 are light transmission type photosensors. However, the configurations of the home position sensor 20 and the DF sensor 25 are not limited thereto. For example, either one of the home position sensor 20 and the DF sensor 25 can be a light reflection type photosensor that reflects light from the light emitting part by the feeler 21A.

Further, a position detector to detect the position of the reader 10A by printing special patterns around the shading sheet 19 and reading the patterns by the reading element 12 or by printing and reading the special patterns in a range out of an original document setting area.

As described above, Example 1 of this disclosure can be applied to the following nine configurations to provide the following effects.

Configuration 1 according to Example 1 of this disclosure corresponds to the image scanner 2A that includes a stationary-document reading section such as the exposure glass 6, a moving-document reading section such as the slit glass 7, a reader such as the reader 10A, a reading element such as a reading element 12, and multiple position detectors such as a combination of the feeler 21 and one of the home position sensor 20 and the DF sensor 25. The stationary-document reading section has a reading face on which an original document is placed. The moving-document reading section is a member over which the original document moves. The moving-document reading section is connected to the stationary-document reading section and has an inclined reading face inclined with respect to the reading face of the stationary-document reading section. The reader reciprocally is disposed between the stationary-document reading section and the moving-document reading section. The reading element is attached to the reader and is movable to different angles while contacting the reading face of the stationary-document reading section and the inclined reading face of the moving-document reading section. The reading element selectively reads an image formed on the original document placed on the stationary-document reading section and an image formed on the original document moving over the moving-document reading section. A plurality of position detectors detect different positions of the reader including a home position of the reader.

According to Configuration 1 of Example 1, an increase in size of an image scanner can be prevented, thereby reducing the size of the image scanner. Further, both a reduction in operating noise generated along with a reciprocating motion of the reader and a reduction in abrasion of a contact portion of the reading element due to sliding on the reading face of the reader can be enhanced.

Configuration 2 according to Example 1 of this disclosure is based on Configuration 1. In Configuration 2, the plurality of position detectors include a first position detector to detect the home position of the reader. The first position detector such as a combination of the feeler 21A and the home position sensor 20 is disposed within the first moving area of the reader where the reading element is not inclined.

Configuration 3 according to Example 1 of this disclosure is based on Configuration 1 and Configuration 2. In Configuration 3, the plurality of position detectors includes the second position detector such as a combination of the feeler 21A and the DF sensor 25. The second position detector is disposed within the second moving area of the reader where the reading element is inclined.

Configuration 4 according to Example 1 of this disclosure is based on Configuration 3. In Configuration 4, the second position detector includes a movable detector and a stationary detector. The movable detector such as the feeler 21A is disposed along the moving direction of the reader. The stationary detector such as the DF sensor 25 detects a position of the reader in the moving direction together with the movable detector. A length in the moving direction of the movable detector is shorter than a length in the moving direction of the reader.

Configuration 5 according to Example 1 of this disclosure is based on Configuration 4. In Configuration 5, at least one of the plurality of position detectors is a light transmission type photosensor.

Configuration 6 according to Example 1 of this disclosure is based on Configuration 4 or Configuration 5. In Configuration 6, at least one of the plurality of position detectors is a light reflection type photosensor.

Configuration 7 according to Example 1 of this disclosure is based on any one of Configuration 4 through Configuration 6. In Configuration 7, at least one of the plurality of position detectors is a mark reader to read a position detecting mark.

Configuration 8 according to Example 1 of this disclosure is based on any one of Configuration 1 through Configuration 7. In Configuration 8, an image forming apparatus such as the image forming apparatus 1 includes an automatic document feeder such as the ADF 3 to feed an original document to the moving-document reading section.

Configuration 9 according to Example 1 of this disclosure is based on any one of Configuration 1 through Configuration 8. In Configuration 9, the image forming apparatus such as the image forming apparatus 1 further includes an image scanner such as the image scanners 2 and 2A having any configuration of Configuration 1 through Configuration 8 to receive the original document fed from the automatic document feeder.

According to Configurations 8 and 9 of Example 1, an increase in size of an image scanner can be prevented, thereby reducing the size of the image scanner. At the same time, both a reduction in operating noise generated along with a reciprocating motion of the reader and a reduction in abrasion of a contact portion of the reading element due to sliding on the reading face of the reader can be enhanced.

Example 2

In order to reduce the operating time to return a flatbed scanner (FBS) carriage to a standby position, comparative image scanners are provided with an end sensor disposed between an ADF and a FBS to detect the position of the carriage. The carriage of the comparative image scanners is designed to move at low speed until the end sensor detects the carriage and at high speed after passing the end sensor.

It is to be noted that the "FBS" of the comparative example corresponds to the stationary-document reading section in Example 2, the ADF of the comparative example corresponds to the moving-document reading section in Example 2, the carriage of the comparative example corresponds to the reader in Example 2, and the standby position of the comparative example corresponds to the home position HP in Example 2.

However, in the above-described image scanner, depending on the position of the carriage, the carriage does not pass the end sensor before reaching the standby position, and therefore cannot run at high speed. Specifically, in a comparative image scanner, a carriage runs along a long distance between an end sensor ES and a home sensor HS, which corresponds to a substantially entire length of an exposure glass of a flatbed scanner when using the flatbed scanner. Therefore, in a case in which the carriage is reset at a position closer to the FBS than the end sensor ES, the carriage runs at low speed before reaching the home sensor HS, and therefore a period of a low speed running becomes relatively long.

Further, the above-described comparative image scanner does not include an inclining portion (or an inclined reading face) in a carriage path.

In order to address this inconvenience, in Example 2 of this disclosure, in a case in which an inclined reading face is provided to a moving path of the reader disposed between the stationary-document reading section and the moving-document reading section, wherever the reader is located, the reader can move to a predetermined position quickly.

Figure 11:
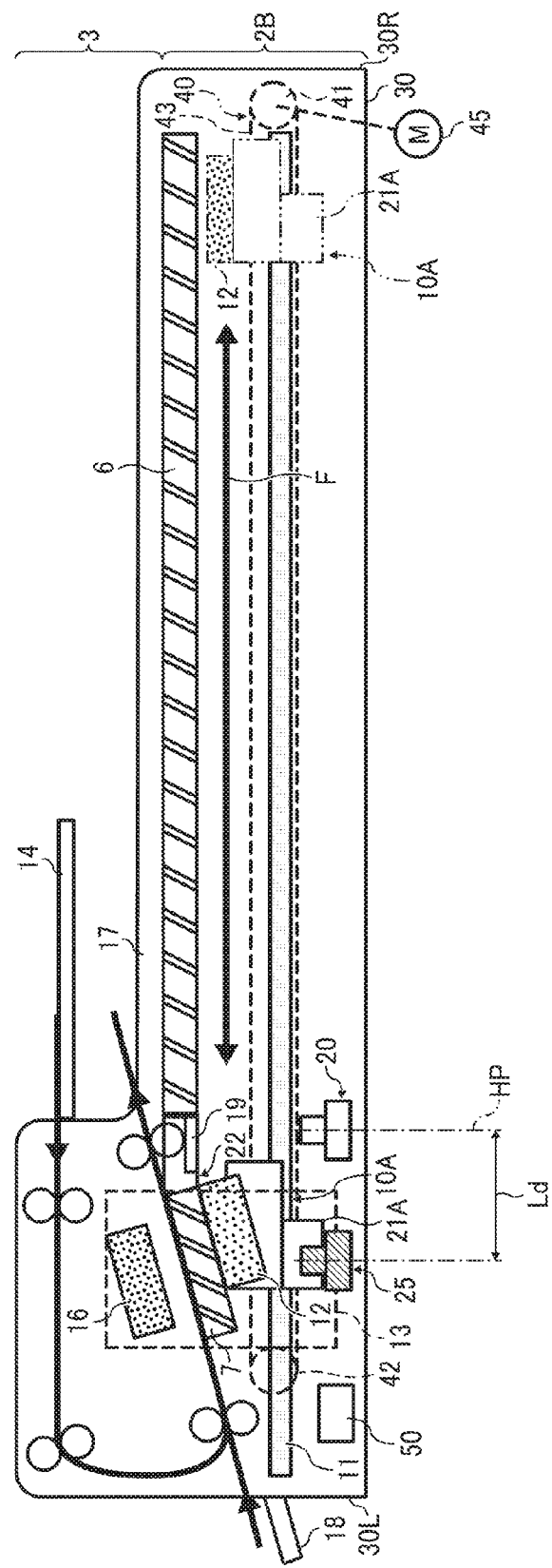
FIG. 11 is a cross sectional view illustrating the configuration and operations of the image scanner and the ADF according to another example of this disclosure.

A description is given of an image scanner 2B according to Example 2 of this disclosure with reference to FIG. 11.

FIG. 11 is a cross sectional view illustrating the configuration and operations of the image scanner and the ADF according to Example 2 of this disclosure.

When compared with the image scanner 2A illustrated in FIGS. 9 and 10, the image scanner 2B illustrated in FIG. 11 is used instead of the image scanner 2A. The image scanner 2B basically has an identical configuration to the image scanner 2A illustrated in FIGS. 9 and 10. Except, the image scanner 2B further includes a moving mechanism 40 and a controller 50.

As illustrated with dashed lines in FIG. 11, the moving mechanism 40 includes multiple timing pulleys 41 and 42, a timing belt 43, and a driving motor 45 that functions as a drive source to rotate the timing pulley 41. The timing belt 43 is shaped as an endless loop. A bracket body of the reader 10A is secured to one position in a circumferential direction of the timing belt 43 and stretched between the multiple timing pulleys 41 and 42 without sagging. The driving motor 45 is a motor to rotate by pulse input. For example, the driving motor 45 is a stepping motor that is rotatable in both forward and reverse directions.

The moving mechanism 40 functions as a moving device that reciprocally moves in the reader 10A between a right end portion of the exposure glass 6 (the maximum reading end position) and the ADF reading position of the slit glass 7. As described above, the reader 10A is moved by the driving motor 45 that functions as a drive source included in the moving mechanism 40, and therefore, movement of the reader 10A is also referred to as a running of the reader 10A.

It is to be noted that the moving mechanism 40 is not limited thereto. For example, any configuration of the moving mechanism 40 including lead screws, wires, or gears can be also applied to this disclosure.

Figure 12:
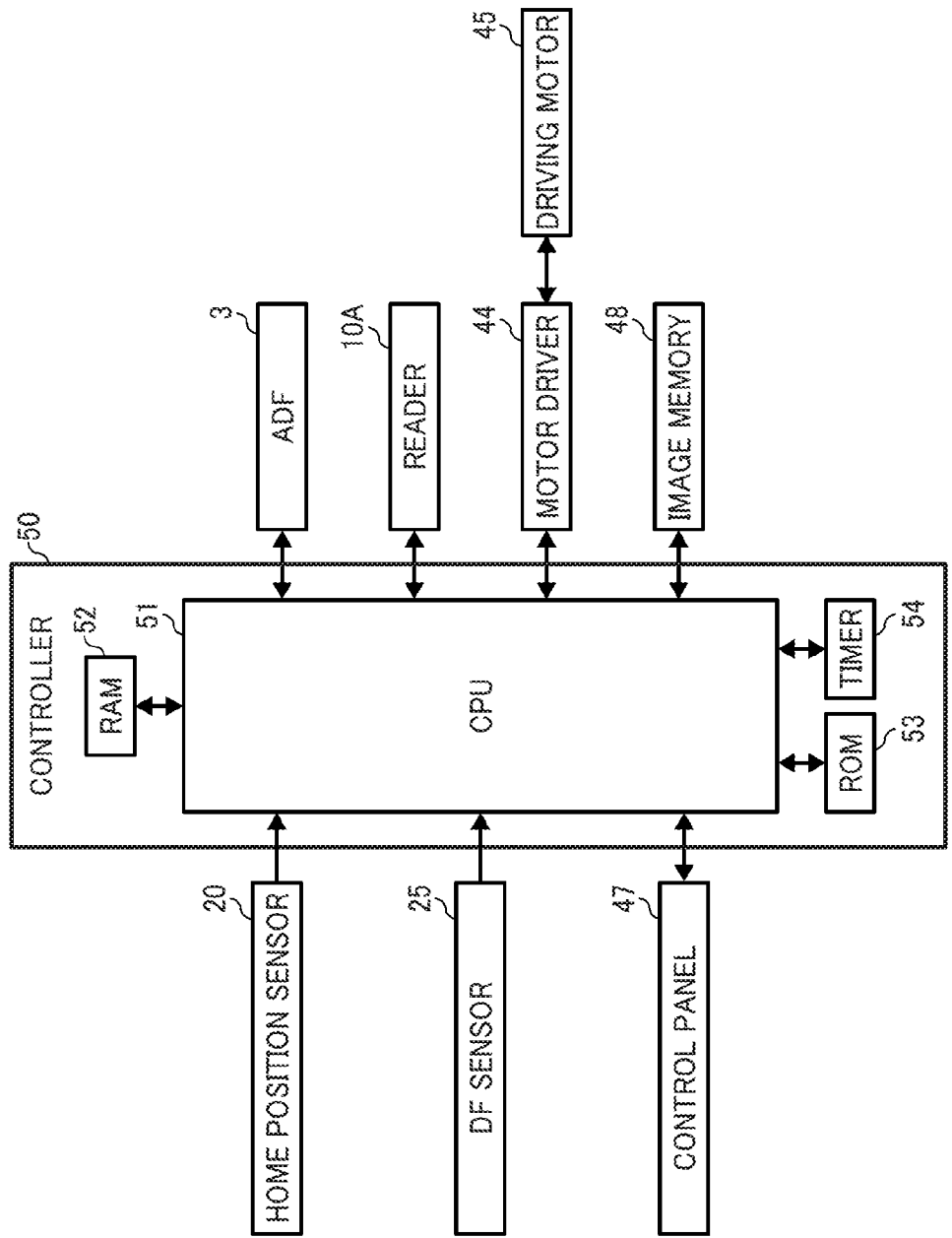
FIG. 12 is a block diagram illustrating a controller and connected devices of the image scanner of FIG. 11.

A description is given of an image scanner 2B according to Example 2 of this disclosure with reference to FIG. 12.

FIG. 12 is a block diagram illustrating the controller 50 and connected devices of the image scanner 2B.

The controller 50 controls the whole operations performed by the image scanner 2B and part of operations performed by the ADF 3 (for example, the feeding of original documents loaded on the ADF 3, the operations performed by a DF reading element). The controller 50 is a microcomputer that includes a central processing unit (CPU) 51, a random access memory (RAM) 52, a read-only memory (ROM) 53, and a timer 54. The CPU 51 functions as a distance calculator and a controlling unit. The RAM 52 and the ROM 53 function as memories. The timer 54 functions as a time measuring unit.

The RAM 52 temporarily stores results of calculation performed by the CPU 51 and other various data.

Figure 13:
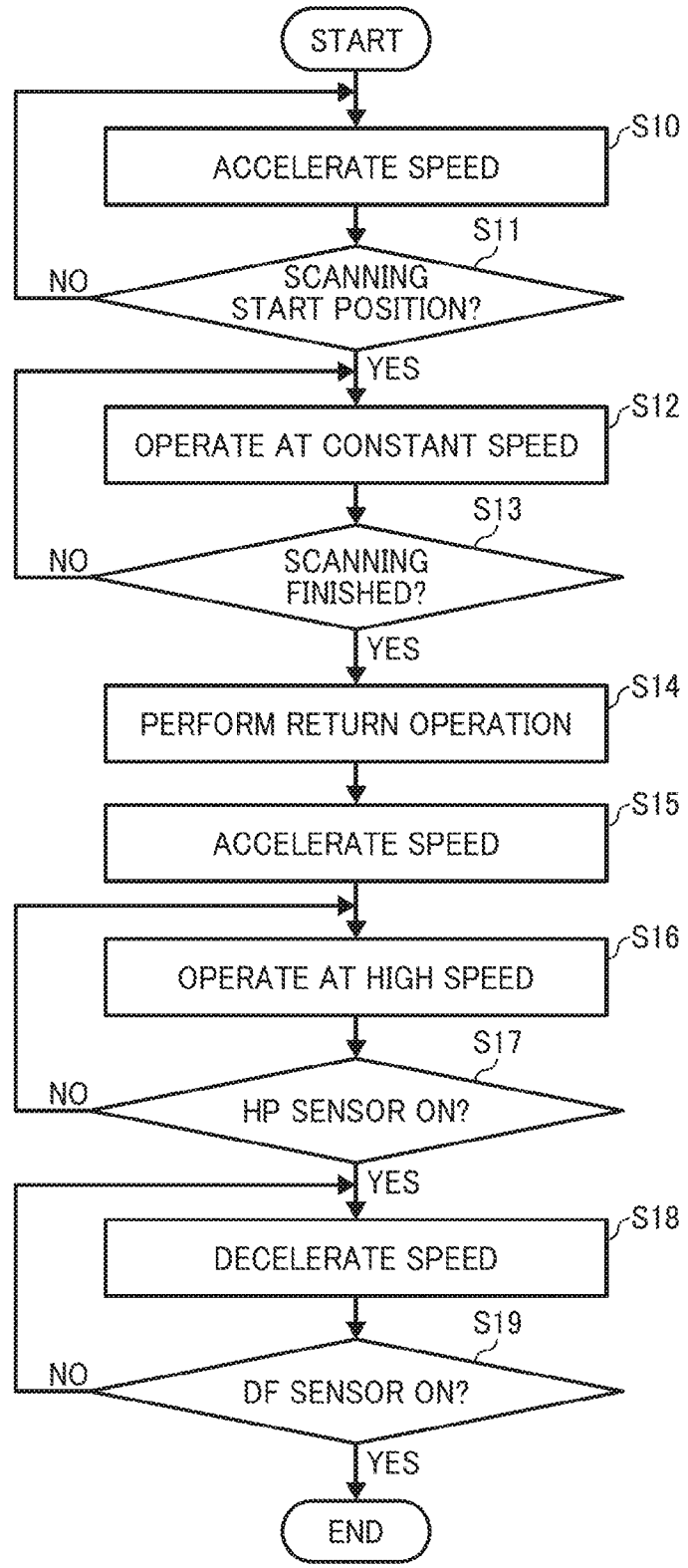
FIG. 13 is a flowchart showing an order of operations of the image scanner of FIG. 11.
Figure 14:
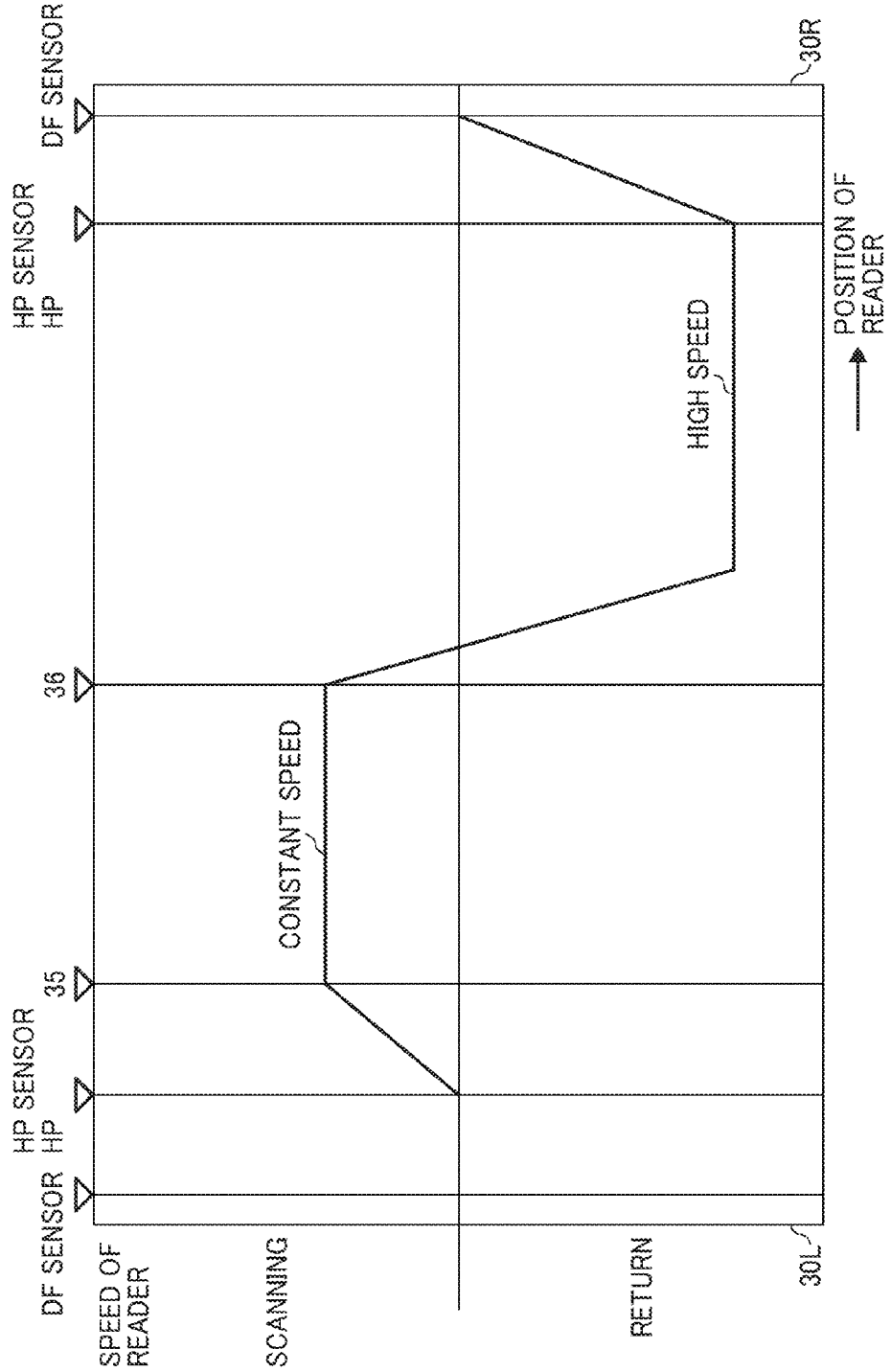
FIG. 14 is a characteristic curve of a moving speed pattern of the reader at respective positions of the reader of the image scanner of FIG. 11.
Figure 15:
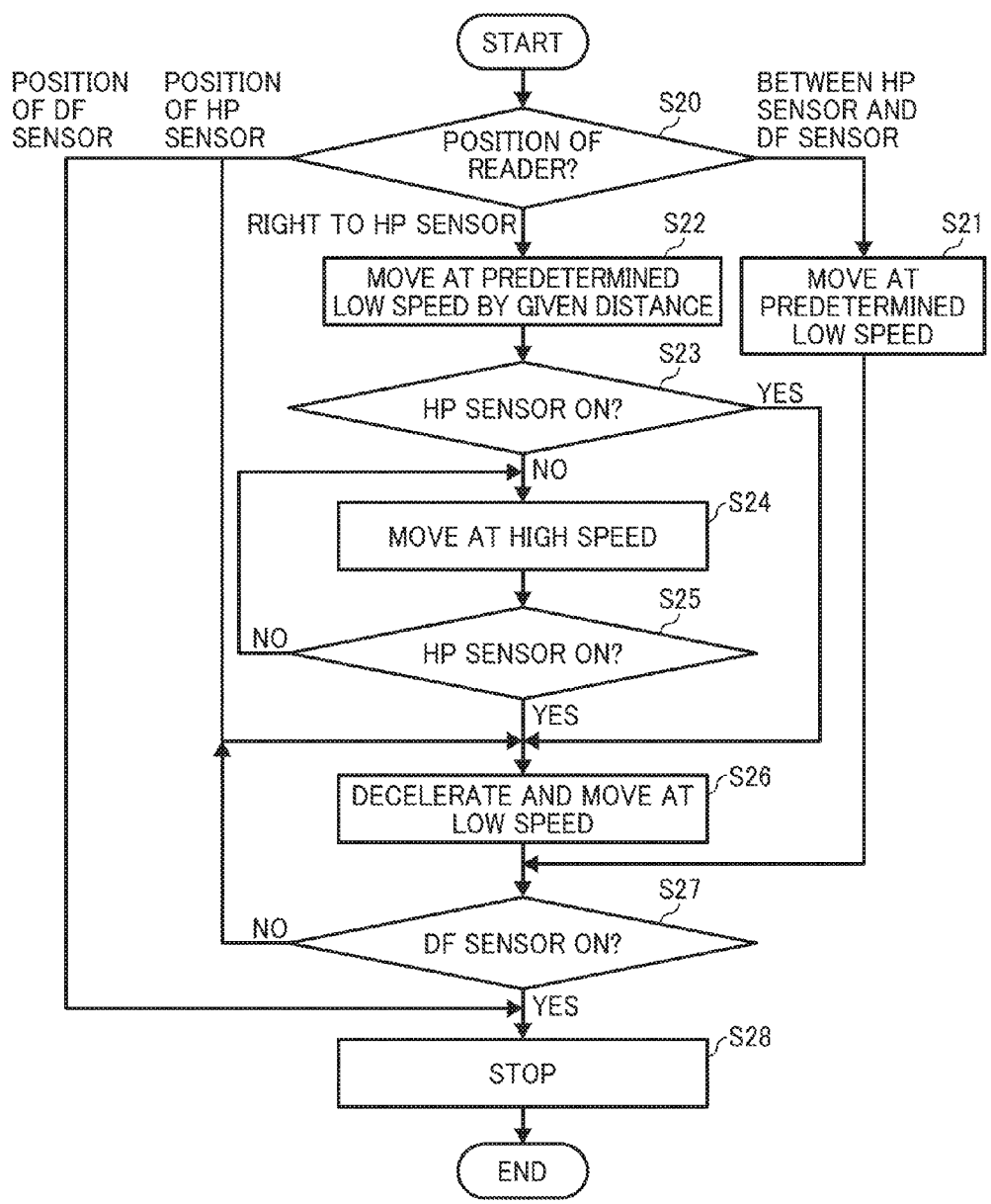
FIG. 15 is a flowchart showing another order of operations of the image scanner of FIG. 11.
Figure 16:
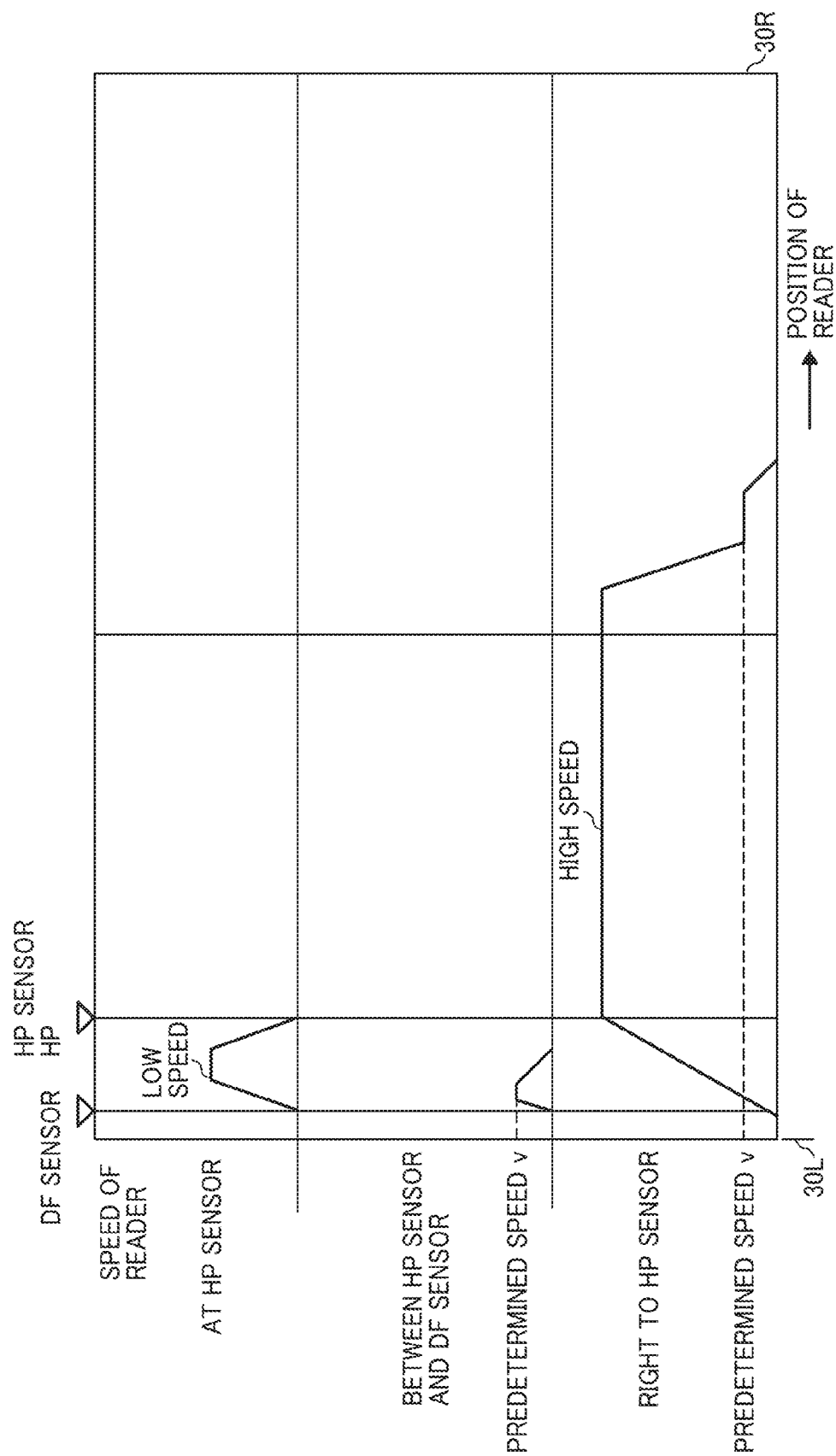
FIG. 16 is a characteristic curve of a moving speed pattern of the reader according to the flowchart of FIG. 15.

The ROM 53 previously stores control programs to be used (see FIGS. 13 and 15) and fixed data (see FIGS. 14 and 16).

The CPU 51 of the controller 50 is electrically connected to the ADF 3, the reader 10A, the home position sensor 20, the DF sensor 25, the driving motor 45 via the motor driver 44, a control panel 47, and an image memory 48.

It is to be noted that the above-described devices electrically connected to the CPU 51 are closely related to the image scanner according to this disclosure and devices connected to the CPU 51 are not limited thereto. In other words, various devices except form the above-described devices may be connected to the CPU 51.

The home position sensor 20 and the DF sensor 25 included in the image scanner 2A are identical to the home position sensor 20 and the DF sensor 25 included in the image scanner 2 according to Example 1. The DF sensor 25 of Example 2 also functions as a position detector that detects a designated position of the reader 10A where the reading element 12 reads an image formed on an original document passing over the slit glass 7 while the reading element 12 is inclined.

It is to be noted that the "designated position" of the reader 10A indicates a position at which the reader 10A can perform an ADF scanner mode when the reader 10A is located in the ADF document reading position 13.

Similar to Example 1, in the reader 10A of Example 2 illustrated in FIG. 11, the position of the home position sensor 20 and the position of the DF sensor 25 is separated by a distance Ld in the moving path in the sub-scanning direction F of the reader 10A. Details of the distance Ld are described in Operation Example 1 below. When the reader 10A returns to the home position HP after completion of the FB reading operation, the reader 10A moves at high speed. The distance Ld is a distance by which the reader 10A slows down the speed before the connecting portion 22 so as not to collide with the connecting portion 22 due to overrun.

It is to be noted that movement (running) of the reader 10A at low speed includes a reduction or deceleration of the speed.

The motor driver 44 includes a drive circuit that generates a driving pulse to be applied to the driving motor 45.

The control panel 47 includes a touch panel, switches, and various keys to input operation instructions to the image scanner 2B and the ADF 3, and a liquid crystal display device (LCD device) via which the above-described operations are visually checked.

The image memory 48 stores image data read by the reader 10A.

The CPU 51 controls the driving motor 45 via the motor driver 44 to cause the reader 10A to run at high speed until the home position sensor 20 detects the home position HP when the reader 10A moves to the ADF document reading position 13.

In addition, the CPU 51 also controls the driving motor 45 via the motor driver 44 to cause the reader 10A to reduce the speed (to run at low speed) until the DF sensor 25 detects a DF sensor position in the ADF document reading position 13 from the home position HP.

The CPU 51 functions as a distance calculator to calculate a distance of movement of the reader 10A from any position (which is also a current position) to the home position HP based on respective signals issued and transmitted by the home position sensor 20 and the DF sensor 25. That is, based on the signals from the home position sensor 20 and the DF sensor 25, the CPU 51 confirms the position of the reader 10A and adds up the number of drive pulses applied to the driving motor 45 via the motor driver 44. By so doing, the CPU 51 can obtain a distance from the home position sensor 20 of the reader 10A located at the predetermined position.

It is to be noted that, instead of addition of the number of drive pulses, an encoder can be used to detect and add up the number of rotations (steps) of the driving motor 45, for example, so as to confirm the position of the reader 10A.

Further, the ROM 53 stores fixed data to control the driving motor 45 to cause the reader 10A to move in a previously determined direction when the reader 10A is reset due to power cut in a state in which the position of the reader 10A is not detected. In other words, the reader 10A is initially set to move to the left side in FIGS. 14 and 16 (toward the DF sensor 25) constantly when the reader 10A is reset in a state in which the position of the reader 10A is not clear.

Operation Example 1

A description is given of an operation example as Operation Example 1 according to Example 2 of this disclosure with reference to FIGS. 10, 11, 13, and 14.

FIG. 13 is a flowchart showing an order of operations of the reader 10A in Operation Example 1 of Example 2. FIG. 14 is a characteristic curve of a moving speed pattern of the reader 10A at respective positions of the reader 10A of the image scanner 2B.

The flowchart of FIG. 13 shows operations performed by the reader 10A moving from the position of the home position sensor 20 to the position of the DF sensor 25. The characteristic curve of FIG. 14 corresponds to the operation of the reader 10A and shows the speed of the reader 10A moving from the position of the home position sensor 20, reading at the FBS, and reaching the position of the DF sensor 25.

Further, inverted triangle marks illustrated at an upper part of FIG. 14 indicate respective positions related to movement of the reader 10 previously set to the image scanner 2B. This indication is identical to FIG. 10. Specifically, the inverted triangle marks indicate that, in the order from the leftmost inverted triangle mark from the left wall 30L to the right wall 30R of the image scanner 2B, the reader 10A reaches and passes the DF sensor position, a HP sensor position, and the scanning start position 35 by reciprocating while reading an image on an original document.

It is to be noted that the "DF sensor position" represents a position where the DF sensor 25 is disposed and that the "HP sensor position" represents a position where the home position sensor 20 is disposed and the home position HP of the reader 10A is disposed.

The characteristic curve of FIG. 14 shows that the reader 10A returns at the maximum reading end position 36 and moves from the maximum reading end position 36 to the right side of FIG. 14 to the HP sensor position and the DF sensor position, which are positions located in a reverse direction opposite the forward direction.

In step S10 in the flowchart of FIG. 13, the image scanner 2B illustrated in FIG. 11 has transited to the FB reading operation and the reader 10A runs from the HP and the HP sensor position to the right side of FIGS. 10 and 14 toward the scanning start position 35. At this time, the reader 10A accelerates until the reader 10A reaches a constant speed suitable for FB reading. Then, the controller 50 checks whether or not the reader 10A has reached the reading start position 35 (step S11 in FIG. 13).

When the reader 10A has reached the scanning start position 35 (YES in step S11), the reader 10A performs the FB reading operation while running at the constant speed (step S12 in FIG. 13).

When the reader 10A has not reached the scanning start position 35 (NO in step S11), the operation of step S10 is repeated.

Then, the controller 50 checks whether or not the FB reading operation has finished (step S13 in FIG. 13). The controller 50 determines the completion of the FB reading operation based on whether or not the reader 10A has reached the maximum reading end position 36 as illustrated in FIG. 14. If the reader 10A has reached the maximum reading end position 36, the FB reading operation ends (YES in step S13).

When the FB reading operation has not yet finished (NO in step S13), the operation of step S12 is repeated.

After the reader 10A has finished the FB reading operation, the controller 50 causes the reader 10A to decelerate as illustrated in FIG. 14. Then, the controller 50 causes the reader 10A to perform a return operation to return to the right side of FIG. 14 (to the left side in FIG. 10) toward the HP sensor position (step S14 in FIG. 13). At the start of the return operation, the controller 50 gradually accelerate the speed of movement of the reader 10A (step S15 in FIG. 13), so as to transit to a predetermined high-speed running to perform the return operation quickly (step S16 in FIG. 13). Consequently, the controller 50 checks whether or not the reader 10A has reached the HP and the HP sensor position during the predetermined high-speed running of the reader 10A. At this time, the controller 50 determines arrival of the reader 10A to the home position sensor 20 based on whether or not the home position sensor 20 is turned on (step S17 in FIG. 13).

When the home position sensor 20 is not turned on (NO in step S17), the operation of step S16 is repeated to continue the predetermined high-speed running of the reader 10A.

When the home position sensor 20 is turned on (YES in step S17), the controller 50 determines that the reader 10A has reached the home position sensor 20. Then, the reader 10A that has been running at high speed is decelerated (step S18 in FIG. 13). At this time, as illustrated in FIG. 11, the reader 10A moves from the connecting portion 22 that is the start of a slope until the reader 10A reaches the ADF document reading position 13 while an upper surface of the reading element 12 is contacting and sliding on a sloped face of the slit glass 7 (step S18 in FIG. 13).

Then, the controller 50 checks whether or not the reader 10A has reached the DF sensor 25 (step S19 in FIG. 13). At this time, the controller 50 determines arrival of the reader 10A to the ADF document reading position 13 and the DF sensor position based on whether or not the DF sensor 25 is turned on.

When the DF sensor 25 is not turned on (NO in step S19), the operation of step S18 is repeated.

When the DF sensor 25 is turned on (YES in step S19), the controller 50 determines that the reader 10A has reached the DF sensor 25 based on the presence of the reader 10A at the ADF reading position 13 and the DF sensor position. Accordingly, the image scanner 2B performs in the ADF scanner mode, and a series of FB reading operation ends.

Operation Example 2

A description is given of another operation example as Operation Example 2 according to Example 2 of this disclosure with reference to FIGS. 10, 11, 15, and 16.

FIG. 15 is a flowchart showing another order of operations of the reader 10A in Operation Example 2 of Example 2. The flowchart of FIG. 15 shows operations performed by the reader 10A whose position in the image scanner 2B is not detected and shows the movement of the reader 10A moving to the DF sensor position where the DF sensor 25 is located. FIG. 16 is a characteristic curve of a moving speed pattern of the reader 10A at respective positions of the reader 10A of the image scanner 2B.

Here, a description is given of the moving speed of the reader 10A with reference to FIGS. 15 and 16. It is to be noted that details of acceleration and deceleration of the reader 10A shown in FIG. 16 are occasionally omitted. The state in which the position of the reader 10A in the image scanner 2B is not detected includes a case in which the image forming apparatus 1 is reset due to power cut, for example, while the position of the reader 10A is not detected.

In order to specify where the reader 10A is currently located, the controller 50 checks the position of the reader 10A in step S20 of FIG. 15.

When the reader 10A is located at the DF sensor position, the reader 10A stays at the DF sensor position and the operation finishes (step S28 in FIG. 15).

When the reader 10A is located at the HP sensor position, the controller 50 causes the reader 10A to run at low speed by a predetermined distance, which is the distance Ld in FIG. 11, and to move the DF sensor position (step S26 in FIG. 15). The movement of the reader 10A corresponds to the moving speed pattern shown in the upper part of FIG. 16.

Then, the controller 50 checks whether or not the reader 10A has reached the DF sensor position and the DF sensor 25 is turned on (step S27 in FIG. 15). When the reader 10A has reached the DF sensor position and the DF sensor 25 is turned on (YES in step S27), the controller 10A causes the reader 10A to stop at the DF sensor position to end the operation when the reader 10A is located at the DF sensor position, the reader 10A stays at the DF sensor position and the operation finishes (step S28 in FIG. 15).

When the reader 10A is not located at the DF sensor position and the DF sensor 25 is not turned on (NO in step S27), the operation of step S26 is repeated.

When the reader 10A is located between the HP sensor position and the DF sensor position, as illustrated in the middle part of FIG. 16, the controller 50 causes the reader 10A to run at a predetermined low speed v, which is a speed at which the reader 10A can stop without overrunning (step S21 in FIG. 15). The predetermined speed v is a speed of movement of the reader 10A that runs slower than the low speed shown in the upper part of FIG. 16.

Then, the controller 50 checks whether or not the reader 10A has reached the DF sensor position and the DF sensor 25 is turned on (step S27 in FIG. 15). When the reader 10A has reached the DF sensor position and the DF sensor 25 is turned on (YES in step S27), the controller 10A causes the reader 10A to stop at the DF sensor position to end the operation (step S28 in FIG. 15).

When the reader 10A is not located at the DF sensor position and the DF sensor 25 is not turned on (NO in step S27), the operation of step S26 is repeated and the reader 10A continues to run at low speed.

In step S20, when the reader 10A is located on the right side from the HP sensor position, which is between the HP sensor position in FIG. 16 and the maximum reading end position 36 on the side of the right wall 30R, as illustrated in the lower part of FIG. 16, the controller 50 causes the reader 10A to run by the predetermined distance at the predetermined low speed v (step S22 in FIG. 15).

Then, the controller 50 checks whether or not the reader 10A has reached the HP sensor position and the home position sensor 20 is turned on (step S23 in FIG. 15). When the reader 10A has reached the HP sensor position and the HP sensor 20 is turned on (YES in step S23), the operation jumps to step S26. When the reader 10A has not reached the HP sensor position and the home position sensor 20 is not turned on (NO in step S23), the controller 10A causes the reader 10A to accelerate to run at high speed (step S24 in FIG. 15). Then, the controller 50 checks whether or not the reader 10A has reached the HP sensor position again (step S25 in FIG. 15).

When the reader 10A has not reached the HP sensor position and the home position sensor 20 is not turned on (NO in step S25), the operation of step S24 is repeated and the reader 10A continues to run at high speed.

When the reader 10A has reached the HP sensor position and the home position sensor 20 is turned on (YES in step S25), the controller 50 causes the reader 10A to decelerate to run at low speed by the predetermined distance (step S26 in FIG. 15). After steps S27 and 28 are performed, the controller 50 causes the reader 10A to stop at the DF sensor position, and the operation ends.

As described above, the image scanner 2B of Example 2 includes the home position sensor 20 that detects the home position HP of the reader 10A. In Example 2, the home position sensor 20 is disposed adjacent to a position closer to the exposure glass 6 than the connecting portion 22 of the exposure glass 6 and the slit glass 7. With this configuration, when performing the return operation, the reader 10A runs at high speed until the reader 10A reaches the HP sensor position. Then, the reader 10A decelerates to run at low speed until the reader 10A reaches the DF sensor position from the HP sensor position. By so doing, the reader 10A can run at high speed without interrupting the operation by causing collision of the reading element 12 provided to the reader 10A with the inclined surface of the slit glass 7. Consequently, wherever the reader 10A is located, the reader 10A can be moved to a designated position quickly.

As described above, Example 2 of this disclosure can be applied to the following five configurations, which are Configuration 10 through Configuration 14, to achieve the following effects.

Configuration 10 according to Example 2 of this disclosure corresponds to an image scanner such as the image scanner 2B that includes a stationary-document reading section such as the exposure glass 6, a moving-document reading section such as the slit glass 7, a reader such as the reader 10A, a reading element such as the reading element 12, a moving device such as the moving mechanism 40, a home position detector such as the home position sensor 20, and a designated position detector such as the DF sensor 25. The stationary-document reading section has a reading face on which an original document is placed. The moving-document reading section is a member over which the original document moves. The moving-document reading section is connected to the stationary-document reading section and has an inclined reading face inclined with respect to the reading face of the stationary-document reading section. The reader is disposed reciprocally movable between the stationary-document reading section and the moving-document reading section. The reading element is attached to the reader and is movable to different angles while contacting the reading face of the stationary-document reading section and the inclined reading face of the moving-document reading section. The reading element selectively reads an image formed on the original document placed on the stationary-document reading section and an image formed on the original document moving over the moving-document reading section. The moving device causes the reader to reciprocate between the stationary-document reading section and the moving-document reading section. The moving device moves the reader from the home position located closer to the stationary-document reading section than a connecting portion connecting the stationary-document reading section and the moving-document reading section. The moving device moves the reader from the home position before the reading element starts to read one of the image formed on the original document placed on the stationary-document reading section and the image formed on the original document conveyed over the moving-document reading section. The home position detector detects the home position of the reader. The designated position detector detects a designated position of the reader at which the reading element reads the image formed on the original document being conveyed over the moving-document reading section. The reader moves at high speed toward the designated position until the home position detector detects the home position and to move from the home position at low speed until the designated position detector detects the designated position.

According to Configuration 10 of Example 2, the reading element of the reader can move at high speed without interrupting the operation by causing collision of the reading element of the reader with the inclined surface of the moving-document reading section. Consequently, wherever the reader is located, the reader can be moved to the designated position quickly.

Configuration 11 according to Example 2 of this disclosure is based on Configuration 10. In Configuration 11, the image scanner such as the image scanner 2B further includes a distance calculator such as the CPU 51 of the controller 50. The distance calculator calculates a distance of movement of the reader such as the reader 10A from any position to the home position based on a signal transmitted by the home position detector and a signal transmitted by the designated position detector.

According to Configuration 11 of Example 2, when the home position detector and the inclined surface of the moving-document reading section are disposed close to each other, the reader can decelerate at the position of the home position detector before the inclined surface of the moving-document reading section. By so doing, the reader is prevented from overrunning after the position of the home position detector.

Configuration 12 according to Example 2 of this disclosure is based on Configuration 10 or Configuration 11. In Configuration 12, a position of the home position detector such as the home position sensor 20 is separated from a position of the designated position detector such as the DF sensor 25 across a predetermined distance.

According to Configuration 12 of Example 2, the reader can slow down the speed at the position of the home position detector, and therefore can be prevented from colliding with the inclined surface of the moving-document reading section due to overrun.

Configuration 13 according to Example 2 of this disclosure is based on any one of Configuration 10 through Configuration 12. In Configuration 13, an image forming apparatus such as the image forming apparatus 1 includes an automatic document feeder such as the ADF 3 to feed an original document to the moving-document reading section.

Configuration 14 according to Example 2 of this disclosure is based on any one of Configuration 10 through Configuration 13. In Configuration 14, the image forming apparatus such as the image forming apparatus 1 further includes an image scanner such as the image scanner 2B has any configuration of Configuration 10 through Configuration 14 to feed the original document to the moving-document reading section.

According to Configuration 14 according to Example 2, the image forming apparatus that can achieve the effect of any one of Configuration 10 through Configuration 13.

Example 3

In recent years, use of hard plastic documents such as credit cards and health insurance cards has been increasing. For example, a comparative image scanner has been disclosed for the purpose of reading multiple plastic documents at high speed. The comparative image scanner includes a single optical scanning unit (hereinafter, referred to as a "comparative reader") that can read an image formed on a moving document and an image formed on a still document. The comparative reader moves between an exposure glass for loading the still document and a slit glass over which the moving document passes.

In order to achieve a compact configuration, the comparative image scanner includes a reading face of the slit glass and a reading face of the exposure glass disposed side by side in line. The reading face of the slit glass is inclined with respect to the reading face of the exposure glass at a predetermined angle.

In the comparative reading device, the comparative reader includes a contact image sensor (CIS) and multiple springs. In order to closely contact the CIS to the reading face of the slit glass and the reading face of the exposure glass, the CIS is pressed against a lower face of the slit glass and a lower face of the exposure glass by the multiple springs. Hereinafter, the exposure glass and the slit glass are occasionally referred to as a transparent member and the CIS is occasionally referred to as a reading element or a reading element. Also, the term "pressing" indicates an action to press down the reading element, for example, so as not to move.

The pressing force and the pressure balance of the multiple springs are set to respective optimal values so as not to cause deterioration in positional precision such as inclination of an image read by the reader while scanning or moving and generate noise, due to variation of friction by contamination of a pressing point and a target to be pressed such as the transparent member. Examples of the pressing point are an upper slider portion of an integrated optical scanning unit, a sliding member such as a shoe, and so forth.

However, when the reading element is inclined at a position where the inclined portion of the moving-document reading section (the slit glass) is disposed aslant, the springs shrink or become shorter compared with the other springs. Consequently, it is likely that the pressing force and the pressure balance of the reading element change even if the respective values are set to respective optimal values in the stationary-document reading section (the exposure glass).

In order to address this inconvenience, the image scanner in Example 3 of this disclosure provides a configuration in which the pressing force and the pressure balance of the reading element having an optimal value in the stationary-document reading section does not change when the reading element is inclined with respect to the reading face of the moving-document reading section.

Figure 17:
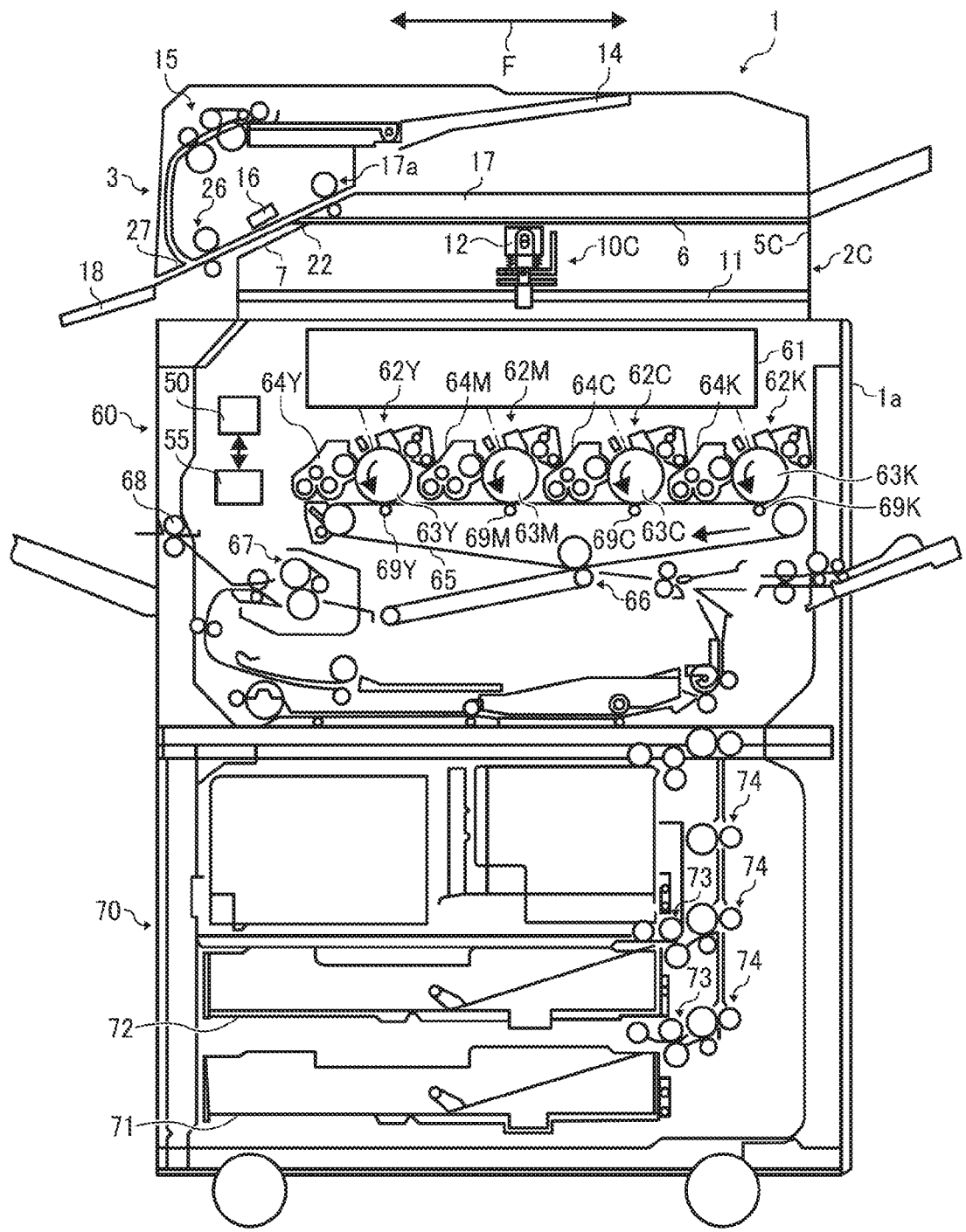
FIG. 17 is a diagram illustrating an entire configuration of the image forming apparatus including the image scanner according to yet another example of this disclosure.
Figure 18:
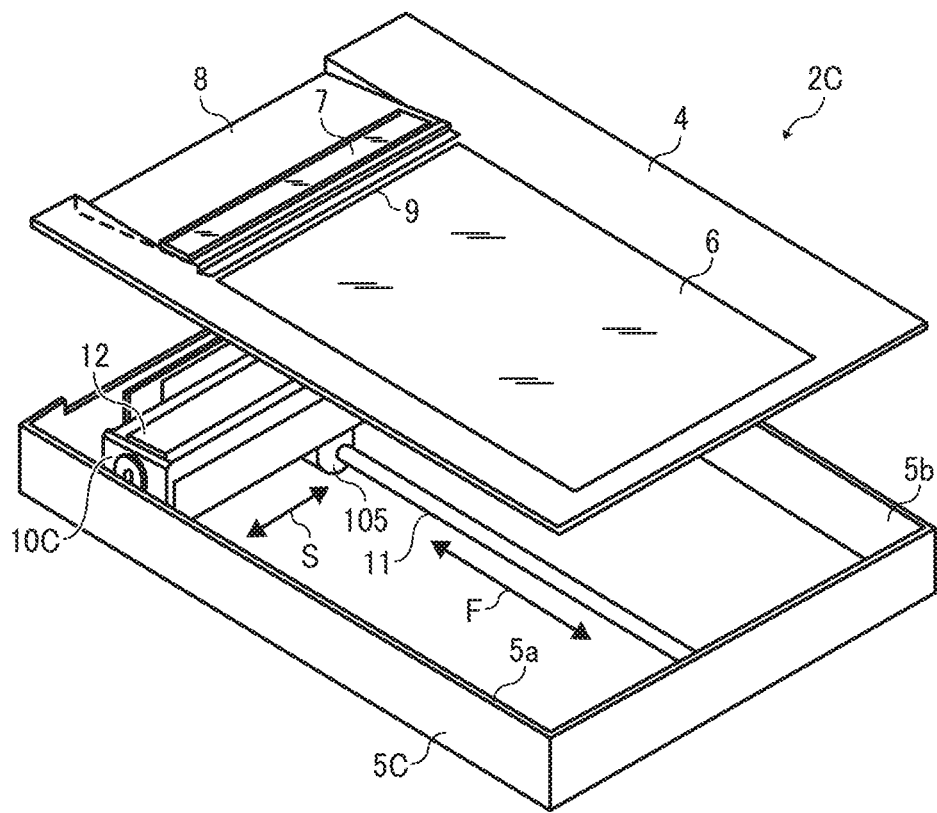
FIG. 18 is a cross sectional view illustrating the image scanner of FIG. 17.

A description is given of an image scanner 2C according to Example 3 of this disclosure with reference to FIGS. 17 and 18.

FIG. 17 is a diagram illustrating an entire configuration of the image forming apparatus 1 including the image scanner 2C according to Example 3 of this disclosure. FIG. 18 is a cross sectional view illustrating the image scanner 2C of Example 3.

As illustrated in FIG. 17, the image forming apparatus 1 of Example 3 corresponds to a color copier. The image forming apparatus 1 of Example 3 includes the image scanner 2C, the ADF 3, an image forming device 60, and a sheet feeding device 70. The ADF 3 is disposed at the upper part of the image scanner 2C.

The image forming apparatus 1 performs image processing and image formation based on image data corresponding to the image of an original document read by the image scanner 2C, and records (prints) the read image on a recording sheet that functions as a recording medium or transmits and outputs an image file. The image forming apparatus 1 is controlled by the controller 50 that is embedded in the image forming apparatus 1. Specifically, the controller 50 controls the operations performed by the image scanner 2C, the ADF 3, the image forming device 60, and the sheet feeding device 70.

The image forming apparatus 1 includes an image transmitting device 55. The image transmitting device 55 that functions as an image transmitter has facsimile functions that can transmit and receive image data of an image, and is connected to a computer such as an external personal computer and a host computer, so as to transmit and receive image data with the computer. The image transmitting device 55 transmits image data of an image formed on an original document read by the image scanner 2C to a target device such as a facsimile machine and an external computer. The image transmitting device 55 is connected to the controller 50 to transmit and receive image data.

The configuration of the ADF 3 in Example 3 is identical to the configuration of the ADF 3 illustrated in FIGS. 1 and 4. However, details of the configuration of the ADF 3 are described in here. The ADF 3 includes the document sheet tray 14 that functions as a first sheet tray and a separating unit 15 that functions as a first separating unit. The separating unit 15 includes various rollers to separate original documents of the bundle of original documents one by one and convey the separated original document toward the slit glass 7. Further, the ADF 3 includes a document feeding device 17a that includes various rollers. When an original document passing over the slit glass 7 is read by the reader 10C of the image scanner 2C, the document feeding device 17a conveys the original document to an output tray of the document discharging portion 17.

The ADF 3 further includes a separating unit 26 that functions as a second separating unit. The separating unit 26 includes various rollers to separate original documents of the bundle of original documents loaded on the bypass tray 18 that functions as a second sheet tray one by one and to convey the separated original document toward the slit glass 7. A document conveying path that extends between the bypass tray 18 and the document discharging portion 17 meets another document conveying path from the document sheet tray 14 via a branch 27. The document conveying path is arranged to extend obliquely straight to an outlet port of the document discharging portion 17.

The slit glass 7 is slanted to the vertical direction with respect to the exposure glass 6. That is, the slit glass 7 has an inclined reading face that is a reading face having different angle from the reading face of the exposure glass 6 and is connected to the exposure glass 6.

Some of the various rollers included in the separating unit 15 can be used in common with the separating unit 26.

The image scanner 2C illustrated in FIGS. 17 and 18 basically has an identical configuration to the image scanner 2 illustrated in FIGS. 1 through 8, except that the image scanner 2C includes a scanner frame 5C instead of the scanner frame 5 and the reader 10C instead of the reader 10.

A detailed description of the configuration of the image scanner 2C is given after a description of the entire configuration of the image forming apparatus 1. That is, the image scanner 2C includes the scanner cover 4, the exposure glass 6, the slit glass 7, the sloped guide surface 8, and the sloped guide 9, as illustrated in FIG. 18. Since the configurations and functions of these units provided to the image scanner 2C are described above, detailed descriptions of these units are omitted here. A description of the scanner frame 5C will be given below.

In FIG. 18 and other following drawings, reference letter "S" represents the main scanning direction and reference letter "F" represents the sub-scanning direction that intersects the main scanning direction S or is perpendicular to the main scanning direction S.

The image forming device 60 is a typical electrophotographic image forming device and includes an exposure device 61 and multiple process cartridges 62Y, 62M, 62C, and 62K detachably attached to the image forming device 60. The process cartridges 62Y, 62M, 62C, and 62K basically have identical configurations to each other, except that the colors of respective toners are different, which are yellow (Y), magenta (M), cyan (C), and black (K). Therefore, the following description is given with reference numeral "62" without any suffix, Y, M, C, and K, but is applied to any one of the process cartridges 62Y, 62M, 62C, and 62K.

It is to be noted that the image forming device 60 is not limited to include the process cartridges 62Y, 62M, 62C, and 62K but may have a configuration that is fixed to an apparatus body 1a.

The process cartridge 62 (i.e., the process cartridges 62Y, 62M, 62C, and 62K in FIG. 17) includes a photoconductor drum 63 (i.e., photoconductor drums 63Y, 63M, 63C, and 63K in FIG. 17) around which a charging device, a developing device 64 (i.e., developing devices 64Y, 64M, 64C, and 64K in FIG. 17), and a cleaning device.

The image forming device 60 further includes an intermediate transfer belt 65, a secondary transfer device 66, a fixing device 67, primary transfer rollers 69Y, 69M, 69C, and 69K.

The sheet feeding device 70 includes sheet trays 71 and 72 and sheet feeding members 73. The sheet trays 71 and 72 are disposed vertically and contain respective sets of sheets having different size from each other. The sheet feeding members 73 are rollers, each of which separates and feeds the sheets contained in each of the sheet trays 71 and 72. The sheet device 70 further includes sheet feeding members 74 including rollers. Each of the sheet feeding members 74 conveys the separated sheet to a secondary transfer position in the image forming device 60.

A description is given of image forming operations performed by the image forming apparatus 1.

The charging devices of the process cartridges 62Y, 62M, 62C, and 62K uniformly charge respective surfaces of the photoconductor drums 63Y, 63M, 63C, and 63K.

The reader 10C of the image scanner 2C reads an image formed on an original document loaded the exposure glass (for example, the exposure glass 6) or passing over the slit glass (for example, the slit glass 7).

Based on image data of the original document read and color-separated by the image scanner 2C, a laser light beam is emitted from the exposure device 61 to the photoconductor drums 63Y, 63M, 63C, and 63K corresponding to the separated colors. As a result, respective electrostatic latent images are formed on the surfaces of the photoconductor drums 63Y, 63M, 63C, and 63K.

Then, the developing devices 64Y, 64M, 64C, and 64K develop the electrostatic latent images into yellow (Y), magenta (M), cyan (C), and black (K) toner images. The toner images are primarily transferred onto a surface of the intermediate transfer belt 65 via the primary transfer rollers 69Y, 69M, 69C, and 69K disposed facing the photoconductor drum 63Y, 63M, 63C, and 63K with the intermediate transfer belt 65 interposed therebetween.

As the toner images are sequentially overlaid onto the surface of the intermediate transfer belt 65, a four-color image is developed.

Substantially simultaneously at the start of the reading operation of the original document, the sheet feeding device 70 starts the sheet feeding operation. Specifically, one of the sheet feeding members 73 is selectively rotated to feed a sheet from one of the sheet trays 71 and 72. The sheet fed from the selected one of the sheet trays 71 and 72 is conveyed by the sheet feeding members 74 toward the secondary transfer device 66 of the image forming device 60. At this time, the secondary transfer device 66 transfers the four-color image formed on the intermediate transfer belt 65 onto the sheet to form a four-color image.

Thereafter, the sheet on which the four-color image is formed is conveyed by a belt conveying device to the fixing device 67. In the fixing device 67, toners of the unfixed four-color image are melted to fix the color image to the sheet. Then, the fixed four-color image is discharged by a pair of sheet discharging rollers 68 to a sheet discharging tray disposed outside the apparatus body 1a of the image forming apparatus 1.

In duplex printing, the sheet is conveyed to the secondary transfer device 66 again via a sheet reversing device and a sheet re-entry device, both of which are disposed at a lower left part from the fixing device 67, so that another image is formed on the other side of the sheet.

Next, a description is given of the above-described different configuration and functions of the image scanner 2C of Example 3, with reference to FIGS. 19A, 19B, 20, 21, and 22.

Figure 19A:
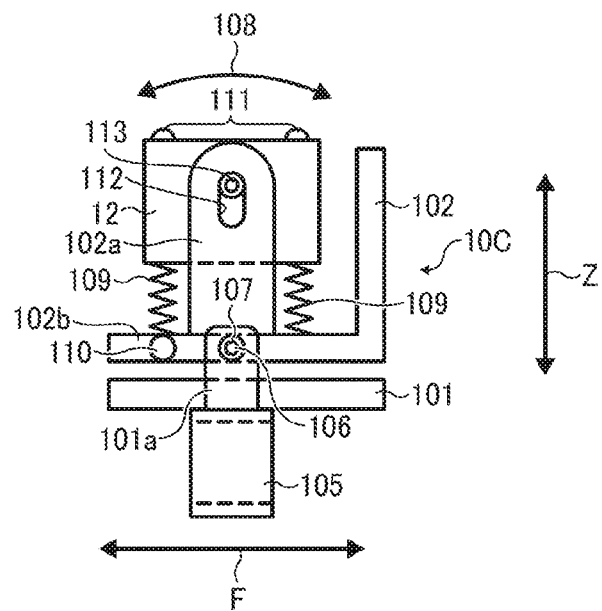
FIG. 19A is a front view illustrating the reader of FIG. 17.
Figure 19B:
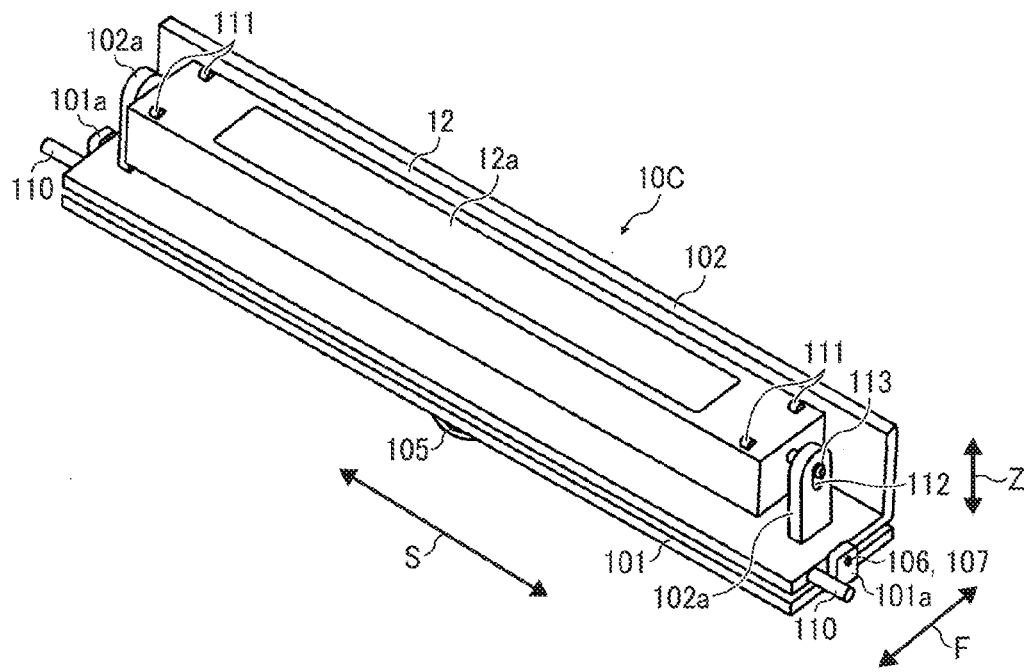
FIG. 19B is a perspective view illustrating the reader of FIG. 17.
Figure 20:
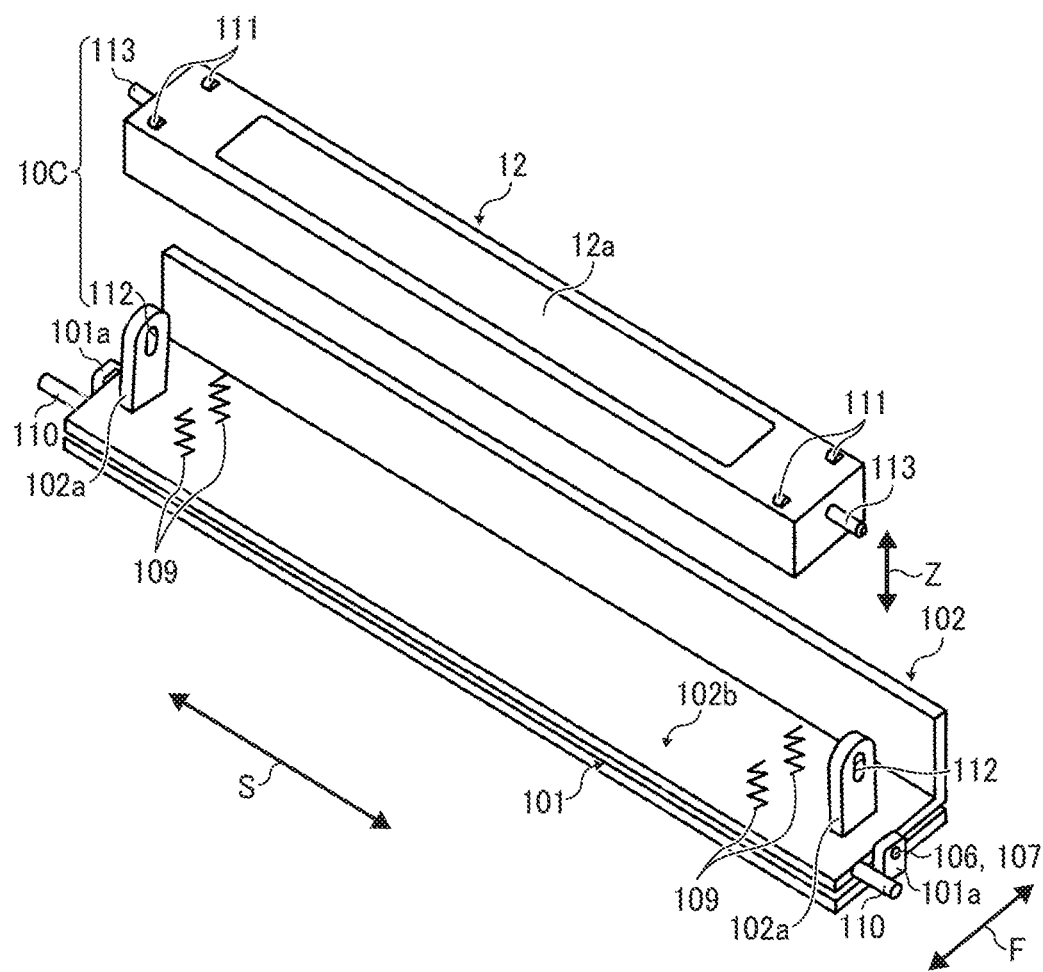
FIG. 20 is an exploded perspective view illustrating the reader of FIG. 17.
Figure 21:
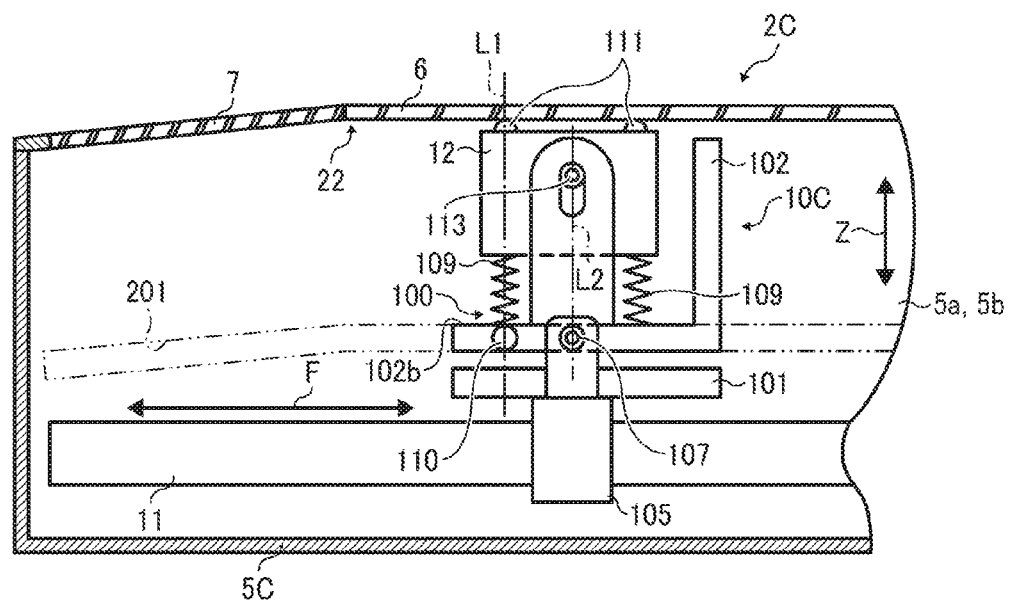
FIG. 21 is a cross sectional view illustrating part of the reader of the image scanner of FIG. 17 located at a stationary-document reading section (the exposure glass)
Figure 22:
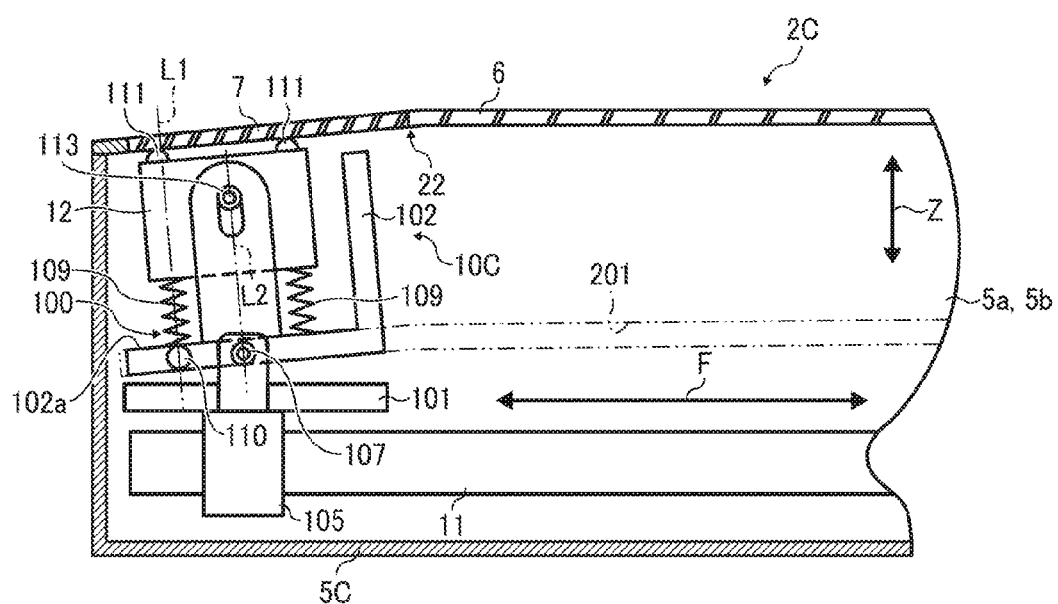
FIG. 22 is a cross sectional view illustrating the reader of the image scanner of FIG. 17 located at a movable original document reader (a slit glass).

FIG. 19A is a front view illustrating the reader 10C of Example 3. FIG. 19B is a perspective view illustrating the reader 10C of FIG. 19A. FIG. 20 is an exploded perspective view illustrating the reader 10C of FIG. 19A. FIG. 21 is a cross sectional view illustrating part of the reader 10C of the image scanner 2C of Example 3 when located at the stationary-document reading section (i.e., the exposure glass 6). FIG. 22 is a cross sectional view illustrating part of the reader 10C of the image scanner 2C of Example 3 when located at the moving-document reading section (i.e., the slit glass 7).

In order to achieve simplification of FIGS. 21 and 22, the sloped guide surface 8 and the sloped guide 9 illustrated in FIG. 18 are omitted and the connecting portion 22 of the exposure glass 6 and the slit glass 7 is simplified.

The image scanner 2C includes the reader 10C in the scanner frame 5C that shapes as a case.

The image scanner 2C illustrated in FIGS. 19A through 22 basically has an identical configuration to the image scanner 2 illustrated in FIGS. 1 through 8, except that the image scanner 2C includes an angle changer 100 illustrated in FIGS. 21 and 22 formed by the following member provided to the scanner frame 5C and the reader 10C.

The reader 10C is scanned (moved) to the sub-scanning direction F by the moving mechanism provided to the image scanner 2C. Accordingly, an original document loaded on the exposure glass 6 or a two-dimensional color image conveyed over the slit glass 7 can be read by the reading element 12.

The reader 10C is driven by the moving mechanism 40 of Example 2 illustrated in FIG. 11, for example, to be reciprocally movable in the sub-scanning direction F.

It is to be noted that the moving mechanism 40 includes a known mechanism.

As illustrated in FIGS. 19A, 19B, and 20, the reader 10C includes the reading element 12, a first bracket 101, a second bracket 102, and multiple springs 109. Four springs 109 are employed in Example 3.

As described above, the reading element 12 has a configuration of an integrated optical scanning unit. Specifically, the reading element 12 includes a scanning region 12a that extends in the main scanning direction S. An image formed on an original document placed on the exposure glass 6 or passing over the slit glass 7 is read in the scanning region 12a.

The reading element 12 holds a light source and a contact image sensor (CIS), the longitudinal direction of which corresponds to the main scanning direction. The reading element 12 reads the image in the main scanning direction by line scanning. It is to be noted that the reading element 12 is not limited to hold the contact image sensor. For example, the reading element 12 may hold a light source, a lens, a charge-coupled device (CCD), and a mirror.

Upper sliders 111 are provided at an upper part of both ends of the reading element 12. The upper sliders 111 are also referred to as "shoes" functioning as sliding members and includes hemispherical projections smoothly sliding in the sub-scanning direction while contacting the lower face of at least one of the exposure glass 6 and the slit glass 7.

Further, support shafts 113 are integrally provided to the reading element 12. The support shafts 113 vertically extend from both end faces of the reading element 12 such that the reading element 12 is coaxially located with the reading element 12.

The first bracket 101 is a planar member having a substantially rectangular flat shape. The first bracket 101 includes a bearing 105 that is fixed to one position in a circumferential direction of a timing belt that has the same configuration as the moving mechanism 40 illustrated in FIG. 11. At the same time, the bearing 105 is slidable along the guide rod 11 in the sub-scanning direction F. The bearing 105 is fixed to the lower center portion in the longitudinal direction of the first bracket 101.

Further, a pair of holder arms 101a is integrally disposed at both ends in the main scanning direction S of the first bracket 101. The pair of holder arms 101a that supports the second bracket 102 extends upward in the vertical direction.

The pair of holder arms 101a is provided with throughholes 106 having a tubular shape. Each of the through-holes 106 is formed on an upper part of each end of the pair of holder arms 101a. Respective shafts 107 are inserted into the corresponding through-holes 106. The shafts 107 are provided at both ends in the main scanning direction S of the second bracket 102, protruding in a horizontal direction. With this configuration, the second bracket 102 swings about the shafts 107 in a direction indicated by arrow 108 in the sub-scanning direction F, as illustrated in FIG. 19A. In other words, the second bracket 102 is rotatably connected and supported about the shafts 107 in the direction 108 in the sub-scanning direction F.

The second bracket 102 is a planar member having an L shape in cross section. The shafts 107 protruding from both ends of the second bracket 102 in the horizontal direction are integrally arranged at both ends of the second bracket 102 in the main scanning direction S. The multiple springs 109 function as pressing members or elastic members and are disposed between an upper face of a bottom part 102b of the second bracket 102 and a lower face of the reading element 12. As previously described, four springs 109 are employed in Example 3. The four springs 109 are identical in spring data specifications such as spring constant to each other. The springs 109 are arranged equally separated from a central axis of each support shaft 113 of the reading element 12 and disposed at constant intervals from the center of the main scanning direction S and the center of the sub-scanning direction F of the reading element 12. The four springs 109 press the reading element 12 to contact exposure glass 6 and the slit glass 7.

The second bracket 102 functions as a case to support the reading element 12 via the multiple (four) springs 109.

Further, the second bracket 102 includes a pair of holder arms 102a. The pair of holder arms 102a is integrally disposed close to both ends of the second bracket 102, protruding upwardly from the bottom part 102b.

Slots 112 are formed on both sides of the pair of holder arms 102a. Each of the slots 112 holds each support shaft 113 of the reading element 12 swingably about a longitudinal axis of the support shaft 113 and movably in a vertical direction Z.

The respective support shafts 113 of the reading element 12 are inserted and fitted into the respective slots 112 of the second bracket 102. By so doing, the reading element 12 is assembled to the second bracket 102. Accordingly, the reading element 12 can rotate or swing about the support shafts 113 in the direction 108 illustrated in FIG. 19A and move in the vertical direction Z toward the pressing direction of the springs 109 that presses the reading element 12 to contact the exposure glass 6 and/or the slit glass 7.

As illustrated in FIG. 21, the position in the sub-scanning direction F of the center of the shaft 107 of the second bracket 102 and the center of the support shaft 113 of the reading element 12 is set to be the same as the position of the reader 10C located at the exposure glass 6.

Further, guided members 110 are provided at both ends in the main scanning direction S of the second bracket 102. The guided member 110 changes an angle of the second bracket 102 in the sub-scanning direction F when the reader 10C moves to the exposure glass 6 or the slit glass 7. Each guided member 110 is integrally provided to the second bracket 102 so that the guided members 110 protrude in the longitudinal direction from both ends in the main scanning direction S of the second bracket 102.

By contrast, as illustrated in FIGS. 21 and 22, the scanner frame 5C includes side walls 5a and 5b disposed inside and facing each other along the main scanning direction S. Gutters 201 are formed on the side walls 5a and 5b inside the scanner frame 5C to fit to each guided member 110 of the second bracket 102. The gutters 201 are depicted with a two-dot chain line.

It is to be noted that the gutters 110 are guiding members to guide the guided members 110, and the guided members 110 are guided members to be guided by the gutters 201.

As illustrated in FIGS. 21 and 22, in the second bracket 102, each guided member 110 is engaged and fitted to each gutter 201. Consequently, the reader 10C is assembled to the scanner frame 5C. Accordingly, when the reader 10C moves to the exposure glass 6 or the slit glass 7, the second bracket 102 swings or rotates about the shaft 107.

The angle of the gutter 201 is set identical to the angle of the inclined reading face, which is the angle of the reading face having different angle in the sub-scanning direction F of the slit glass 7. Accordingly, as illustrated in FIGS. 21 and 22, the interval of the upper face of the bottom 102b of the second bracket 102 and the lower face of the reading element 12 is set identical when the reader 10C is located at the slit glass 7 and when the reader 10C is located at the exposure glass 6.

Further, the respective lengths of stretch of the four springs 109 are constantly identical to each other. In other words, the angle in the sub-scanning direction F at the center of the gutter 201 is set to be parallel to the lower face of the exposure glass 6 in a projection range of the exposure glass 6 in the vertical direction Z and to the lower face of the slit glass 7 in a projection range of the slit glass 7 in the vertical direction Z.

In order to achieve simplification of FIGS. 21 and 22, the angle of the gutter 201 in the sub-scanning direction F is explained with a schematic inclined angle, but the angle that is applicable to this disclosure is not limited thereto. Specifically, even if the image scanner 2C includes the sloped guide surface 8 and the sloped guide 9 as illustrated in FIGS. 2 and 3, the configuration of the image scanner 2C may include gutters having the angle of inclination.

In FIGS. 21 and 22, a straight line L1 illustrated with a dot-dashed line indicates a straight line intersecting a center of the guided member 110, a center in a length direction of the spring 109 disposed between the reading element 12 and the second bracket 102, and a center of the upper slider 111. Further, a straight line L2 in FIGS. 21 and 22 is a straight line intersecting a center of the shaft 107 of the second bracket 102 and a center of the support shaft 113 of the reading element 12.

As illustrated in FIG. 21, the position of the guided member 110 is set such that the straight line L1 and the straight line L2 are constantly parallel to each other when the reader 10C is located at the exposure glass 6. Similarly, the position of the guided member 110 is also set such that the straight line L1 and the straight line L2 are constantly parallel to each other when the reader 10C is located at the slit glass 7.

As described above, angle changer 100 changes the bottom 102b of the second bracket 102 that functions as a case from a state in which the bottom 102b is located substantially parallel to the reading face of the exposure glass 6 to a state in which the bottom 102b is inclined at the substantially same angle as the inclined reading face of the slit glass 7 or the reading face of the slit glass 7 at a different angle.

The angle changer 100 has a configuration that the second bracket 102 swings about the shafts 107 and includes the guided members 110 and the gutters 201.

As described above, Example 3 of this disclosure can be applied to the following five configurations, which are Configuration 15 through Configuration 19, to achieve the following effects.

Configuration 15 according to Example 3 of this disclosure corresponds to an image scanner such as the image scanner 2C that includes a stationary-document reading section such as the exposure glass 6, a moving-document reading section such as the slit glass 7, a reader such as the reader 10C, a reading element such as the reading element 12, at least one pressing member such as the multiple springs 109, a framework such as the second bracket 102, and an angle changer such as the angle changer 100. The stationary-document reading section has a reading face on which an original document is placed. The moving-document reading section is a member over which the original document moves. The moving-document reading section is connected to the stationary-document reading section and has a reading face disposed at a different angle from the reading face of the stationary-document reading section. The reader is disposed movable between the stationary-document reading section and the moving-document reading section. The reading element is attached to the reader and vertically pivotable and movable while contacting the reading face of the stationary-document reading section and the reading face of the moving-document reading section. The reading element selectively reads an image formed on the original document placed on the stationary-document reading section and an image formed on the original document being conveyed over the moving-document reading section. The at least one pressing member presses the reading element against the reading face of the stationary-document reading section and the reading face of the moving-document reading section. The framework supports the reading element via the at least one pressing member. The angle changer changes the framework from an angle substantially parallel to the reading face of the stationary-document reading section to an angle substantially identical to the reading face of the moving-document reading section.

According to Configuration 15 of Example 3, the pressing force and the pressure balance of the reading element having an optimal value in the stationary-document reading section does not change when the reading element is inclined with respect to the reading face of the moving-document reading section.

Configuration 16 according to Example 3 of this disclosure is based on Configuration 15. In Configuration 16, the angle changer changes the angle of the framework to have an angle substantially parallel to the reading face of the moving-document reading section.

According to Configuration 16 of Example 3, the pressing force and the pressure balance of the reading element having an optimal value in the stationary-document reading section does not change and can maintain the optimal value more reliably when the reading element is inclined with respect to the reading face of the moving-document reading section. Therefore, according to Configuration 16 of Example 3, the image scanner can achieve the effect of Configuration 16.

Configuration 17 according to Example 3 of this disclosure is based on any one of Configuration 15 and 16. In Configuration 17, an image forming apparatus such as the image forming apparatus 1 includes an automatic document feeder such as the ADF 3 to feed an original document to the moving-document reading section.

Configuration 18 according to Example 3 of this disclosure is based on any one of Configurations 15 through 17. In Configuration 18, the image forming apparatus such as the image forming apparatus 1 further includes an image scanner such as the image scanner 2C to receive the document fed from the automatic document feeder.

According to Configuration 18 according to Example 3, the image forming apparatus can achieve the effect of any one of Configuration 15 through Configuration 17.

Configuration 19 according to Example 3 of this disclosure is based on Configuration 19. In Configuration 19, the image forming apparatus further includes an image transmitter device such as the image transmitting device 55 to transmit and receive image data.

According to Configuration 19 according to Example 3, the image forming apparatus can achieve the effect to transmit and receive image data read by the image scanner of any one of Configuration 15 through Configuration 17.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image scanner, comprising:
a stationary-document reading section including a first reading face, the first reading face configured to have a document placed thereon;
a moving-document reading section configured to receive the document such that the document moves over the moving-document reading section, the moving-document reading section connected to the stationary-document reading section, and the moving-document reading section including a second reading face inclined with respect to the first reading face;
a reader configured to move a first length along a moving direction between the stationary-document reading section and the moving-document reading section;
a reading element attached to the reader, the reading element configured to,
move between a plurality of angles while the reading element contacts the first reading face and the second reading face,
read a first image on the document when placed on the stationary-document reading section, and
read a second image on the document when received by the moving-document reading section; and
a plurality of position detectors configured to detect a plurality of positions of the reader and the reading element, a first position of the plurality of positions of the reader including a home position, the plurality of position detectors including a first position detector in a first moving area of the reader where the reading element is configured to incline, the first position detector including,
a movable detector, the movable detector configured to move a second length along the moving direction of the reader, the second length shorter than the first length, and
a stationary detector, the stationary detector configured to detect a position of the reader and the movable detector in the moving direction.

2. The image scanner according to claim 1,
wherein the plurality of position detectors includes a second position detector, the second position detector configured to detect the home position of the reader, the second position detector is in a second moving area of the reader where the reading element is configured not to incline.

3. The image scanner according to claim 1,
wherein at least one of the plurality of position detectors is a light transmission type photo-sensor.

4. The image scanner according to claim 1,
wherein at least one of the plurality of position detectors is a light reflection type photo-sensor.

5. The image scanner according to claim 1,
wherein at least one of the plurality of position detectors is a mark reader, the mark reader is configured to read a position detecting mark.

6. An image forming apparatus, comprising:
an automatic document feeder configured to feed a document to the moving-document reading section according to claim 1; and
the image scanner according to claim 1, the image scanner configured to receive the document fed from the automatic document feeder.

7. The image forming apparatus according to claim 6, further comprising,
an image transmitter configured to transmit and receive image data.

8. An image scanner, comprising:
a stationary-document reading section including a first reading face, the first reading face configured to have a document placed thereon;
a moving-document reading section configured to receive the document such that the document moves over the moving-document reading section, the moving-document reading section connected to the stationary-document reading section, and the moving-document reading section including a second reading face inclined with respect to the first reading face;
a reader configured to move between the stationary-document reading section and the moving-document reading section;
a reading element attached to the reader, the reading element configured to,
move between a plurality of angles while the reading element contacts the first reading face and the second reading face
read a first image on the document when placed on the stationary-document reading section, and
read a second image on the document when received by the moving-document reading section;
a moving device configured to,
move the reader between the stationary-document reading section and the moving-document reading section,
move the reader to a home position, the home position a first distance from the stationary-document reading section, the stationary-document reading section a second distance from a connecting portion, the connecting portion connecting the stationary-document reading section and the moving-document reading section, the first distance shorter than the second distance, and
move the reader from the home position before the reading element configured to start reading at least one of (i) the first image on the document when the document is on the stationary-document reading section, and (ii) the second image on the document when the document is received by the moving-document reading section;
a home position detector configured to detect the home position of the reader; and
a designated position detector configured to detect a designated position of the reader at which the reading element configured to read the second image on the document when the document is received by the moving-document reading section,
wherein the reader is configured to,
move at a first speed toward the designated position until the home position detector is configured to detect the home position, and to
move from the home position at a second speed until the designated position detector is configured to detect the designated position, the first speed is greater than the second speed.

9. The image scanner according to claim 8, further comprising:
a distance calculator configured to calculate a distance of movement of the reader from first position to the home position based on (i) a first signal transmitted by the home position detector, and (ii) a second signal transmitted by the designated position detector.

10. The image scanner according to claim 8,
wherein the home position detector is separated by the designated position detector by a desired distance.

11. An image forming apparatus comprising:
an automatic document feeder configured to feed a document to the moving-document reading section according to claim 8; and
the image scanner according to claim 8 configured to receive the document fed from the automatic document feeder.

12. The image forming apparatus according to claim 11, further comprising:
an image transmitter configured to transmit and receive image data.

13. An image scanner, comprising:
a stationary-document reading section including a first reading face, the first reading configured to have a document placed thereon;
a moving-document reading section configured to receive the document such that the document moves over the moving-document reading section, the moving-document reading section connected to the stationary-document reading section, and the moving-document reading section including a second reading face inclined at an angle with respect to the first reading face;
a reader configured to move a first length along a moving direction between the stationary-document reading section and the moving-document reading section;
a reading element attached to the reader, the reading element configured to,
vertically pivot and move while the reading element contacts the first reading face and the second reading face,
read a first image on the document when the document placed on the stationary-document reading section, and
read a second image on the document when the document received by the moving-document reading section;
at least one pressing member configured to press the reading element against the first reading face and the second reading face;
a framework configured to support the reading element via the at least one pressing member;
an angle changer configured to change the framework from a first angle substantially parallel to the first reading face to a second angle substantially identical to the second reading face; and
a plurality of position detectors configured to detect a plurality of positions of the reader and the reading element, a first position of the plurality of positions of the reader including a home position, the plurality of position detectors including a first position detector, the first position detector including a movable detector, the movable detector configured to move a second length along the moving direction, the second length shorter than the first length.

14. The image scanner according to claim 13, wherein the angle changer configured to change the first angle of the framework to have a third angle which is substantially parallel to the second reading face.

15. An image forming apparatus, comprising:
   an automatic document feeder configured to feed a document to the moving-document reading section according to claim 13; and
   the image scanner according to claim 13 configured to receive the document fed from the automatic document feeder.

16. The image forming apparatus according to claim 15, further comprising:
   an image transmitter configured to transmit and receive image data.

17. The image scanner of claim 13, wherein the first position detector further includes a stationary detector, the stationary detector is configured to detect a position of the reader and the movable detector in the moving direction.

18. The image scanner of claim 17, wherein the moveable detector is a feeler and the stationary detector is a DF sensor.

* * * * *